(12) United States Patent
Avadhanula et al.

(10) Patent No.: US 10,055,203 B2
(45) Date of Patent: *Aug. 21, 2018

(54) IMPLICIT EVENT BROADCAST IN A STATE CHART OF A TECHNICAL COMPUTING ENVIRONMENT

(71) Applicant: The MathWorks, Inc., Natick, MA (US)

(72) Inventors: Srinath Avadhanula, Sudbury, MA (US); Pieter J. Mosterman, Framingham, MA (US); Ebrahim Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,017

(22) Filed: May 23, 2014

(65) Prior Publication Data

US 2014/0359561 A1 Dec. 4, 2014

Related U.S. Application Data

(60) Provisional application No. 61/827,863, filed on May 28, 2013.

(51) Int. Cl.
*G06F 9/44* (2018.01)
*G06F 9/45* (2006.01)
(Continued)

(52) U.S. Cl.
CPC ............... *G06F 8/35* (2013.01); *G06F 8/10* (2013.01); *G06F 8/34* (2013.01); *G06F 8/51* (2013.01);
(Continued)

(58) Field of Classification Search
CPC ...... G06F 8/34; G06F 8/35; G06F 8/51; G06F 8/10; G06F 2217/74; G06F 9/4484; G06F 9/4498

See application file for complete search history.

(56) References Cited

U.S. PATENT DOCUMENTS 5,313,574 A * 5/1994 Beethe .................. G06F 9/4843
715/763
5,497,500 A * 3/1996 Rogers ...................... G06F 8/34
714/E11.217

(Continued)

FOREIGN PATENT DOCUMENTS

WO WO 2007/027622 3/2007

OTHER PUBLICATIONS

Notification of Transmittal of the International Search Report and the Written Opinion of the International Searching Authority, or the Declaration corresponding to PCT/US2014/039574, dated Nov. 10, 2014, 10 pages.

(Continued)

*Primary Examiner* — Todd Aguilera
*Assistant Examiner* — Erika Kretzmer
(74) *Attorney, Agent, or Firm* — Harrity & Harrity, LLP

(57) ABSTRACT

A method of receiving a state chart that includes two or more state blocks, and an implicit event command in a graphical portion of the state chart. One of the state blocks includes textual code understood by a textual engine of a technical computing environment (TCE). The implicit event command is not understood by a graphical engine of the TCE. The method further transforms the implicit event command into a form that is understood by the graphical engine, and initiates execution of the state chart. During execution of the state chart, the transformed implicit event command is parsed by a computing device to identify an event associated with a first state block, and a command. When the event (Continued)

occurs during execution of the state chart, the command initiates execution of another state block, the second state block being initiated without an explicit event command being provided therein.

20 Claims, 17 Drawing Sheets

(51) Int. Cl.
    *G06F 8/35*     (2018.01)
    *G06F 8/51*     (2018.01)
    *G06F 8/10*     (2018.01)
    *G06F 8/34*     (2018.01)
    *G06F 9/448*     (2018.01)

(52) U.S. Cl.
    CPC ............ *G06F 9/444* (2013.01); *G06F 9/4425* (2013.01); *G06F 9/4484* (2018.02); *G06F 9/4498* (2018.02)

(56) References Cited

U.S. PATENT DOCUMENTS

| | | | | |
|---|---|---|---|---|
| 5,821,934 | A * | 10/1998 | Kodosky | G06F 3/04847 703/15 |
| 6,282,699 | B1 | 8/2001 | Zhang et al. | |
| 7,020,850 | B2 * | 3/2006 | Raghavan | G06F 8/34 703/23 |
| 7,200,843 | B2 * | 4/2007 | Shann | G06F 8/54 717/162 |
| 7,487,076 | B2 * | 2/2009 | Szpak | G06F 17/5009 703/14 |
| 7,801,715 | B2 * | 9/2010 | Ciolfi | G06F 17/5009 703/13 |
| 7,809,545 | B2 * | 10/2010 | Ciolfi | G06F 8/34 703/22 |
| 7,810,077 | B2 * | 10/2010 | Bracha | G06F 8/315 717/118 |
| 7,823,121 | B1 * | 10/2010 | Zarrinkoub | G06F 8/34 715/763 |
| 7,941,303 | B1 | 5/2011 | Raghavan et al. | |
| 7,954,059 | B2 * | 5/2011 | Macklem | G06F 8/34 715/234 |
| 7,975,233 | B2 * | 7/2011 | Macklem | G06F 8/34 715/234 |
| 8,234,630 | B2 * | 7/2012 | Raghavan et al. | 717/125 |
| 8,271,943 | B2 * | 9/2012 | Hudson | G06F 8/34 717/113 |
| 8,423,981 | B2 * | 4/2013 | Hudson, III | G06F 8/34 717/114 |
| 8,655,636 | B2 * | 2/2014 | Kumar | G06F 9/444 703/13 |
| 8,782,599 | B2 * | 7/2014 | Eldridge | G06F 8/34 717/104 |
| 8,793,602 | B2 * | 7/2014 | Szpak | G06F 9/542 345/173 |
| 8,943,466 | B2 * | 1/2015 | Bray | G06F 8/34 717/106 |
| 9,182,980 | B2 * | 11/2015 | Campbell | G06F 8/72 |
| 9,411,559 | B2 * | 8/2016 | Avadhanula | G06F 8/35 |
| 9,454,382 | B2 * | 9/2016 | Adler | G06F 8/35 |
| 9,507,572 | B2 * | 11/2016 | Avadhanula | G06F 8/35 |
| 9,513,880 | B2 * | 12/2016 | Avadhanula | G06F 8/35 |
| 9,547,481 | B2 * | 1/2017 | Avadhanula | G06F 8/35 |
| 9,645,915 | B2 * | 5/2017 | Bienkowski | G06F 11/3688 |
| 9,774,699 | B2 * | 9/2017 | Ogilvie | H04L 67/34 |
| 2002/0170041 | A1 * | 11/2002 | Shann | G06F 8/54 717/141 |
| 2003/0046658 | A1 * | 3/2003 | Raghavan | G06F 8/34 717/106 |
| 2004/0210592 | A1 * | 10/2004 | Ciolfi | G06F 8/34 |
| 2005/0096894 | A1 * | 5/2005 | Szpak | G06F 17/5009 703/13 |
| 2005/0160397 | A1 * | 7/2005 | Szpak | G06F 9/542 717/104 |
| 2005/0216248 | A1 * | 9/2005 | Ciolfi | G06F 17/5009 703/22 |
| 2006/0139587 | A1 * | 6/2006 | Rossing | G03F 7/70483 355/53 |
| 2006/0236315 | A1 * | 10/2006 | Bracha | G06F 8/315 717/168 |
| 2007/0067761 | A1 * | 3/2007 | Ogilvie | G06F 8/34 717/146 |
| 2007/0261019 | A1 * | 11/2007 | Raghavan et al. | 717/105 |
| 2008/0022259 | A1 * | 1/2008 | MacKlem | G06F 8/34 717/113 |
| 2008/0022264 | A1 * | 1/2008 | Macklem | G06F 8/34 717/136 |
| 2008/0127058 | A1 * | 5/2008 | Bray | G06F 8/34 717/106 |
| 2008/0270920 | A1 * | 10/2008 | Hudson | G06F 8/34 715/763 |
| 2009/0327942 | A1 * | 12/2009 | Eldridge | G06F 8/34 715/771 |
| 2010/0325617 | A1 * | 12/2010 | Hudson, III | G06F 8/34 717/140 |
| 2011/0320178 | A1 * | 12/2011 | Kumar | G06F 9/444 703/2 |
| 2013/0024837 | A1 * | 1/2013 | Bienkowski | G06F 11/3688 717/109 |
| 2014/0165035 | A1 * | 6/2014 | Campbell | G06F 8/72 717/121 |
| 2014/0359560 | A1 * | 12/2014 | Avadhanula et al. | 717/105 |
| 2014/0359561 | A1 * | 12/2014 | Avadhanula et al. | 717/105 |
| 2014/0359566 | A1 * | 12/2014 | Avadhanula et al. | 717/109 |
| 2014/0359567 | A1 * | 12/2014 | Avadhanula et al. | 717/109 |
| 2014/0359568 | A1 * | 12/2014 | Avadhanula et al. | 717/109 |
| 2014/0359569 | A1 * | 12/2014 | Avadhanula et al. | 717/109 |
| 2015/0106781 | A1 * | 4/2015 | Adler | G06F 9/4436 717/104 |

OTHER PUBLICATIONS

The MathWorks, "Stateflow® 7, User's Guide", The MathWorks, Inc., Matlab and Simulink, © 1997-2011, 1509 pages.

\* cited by examiner

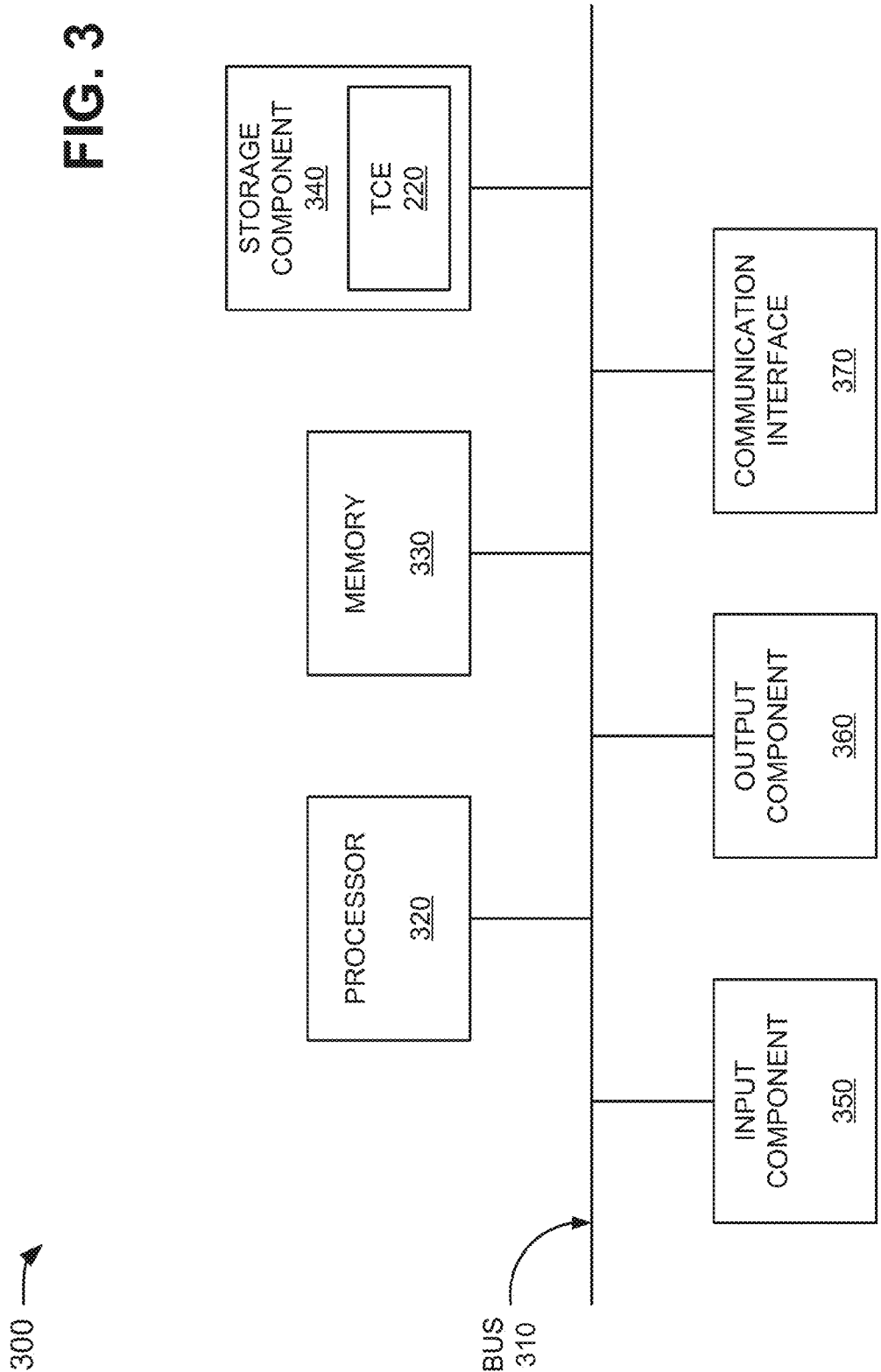

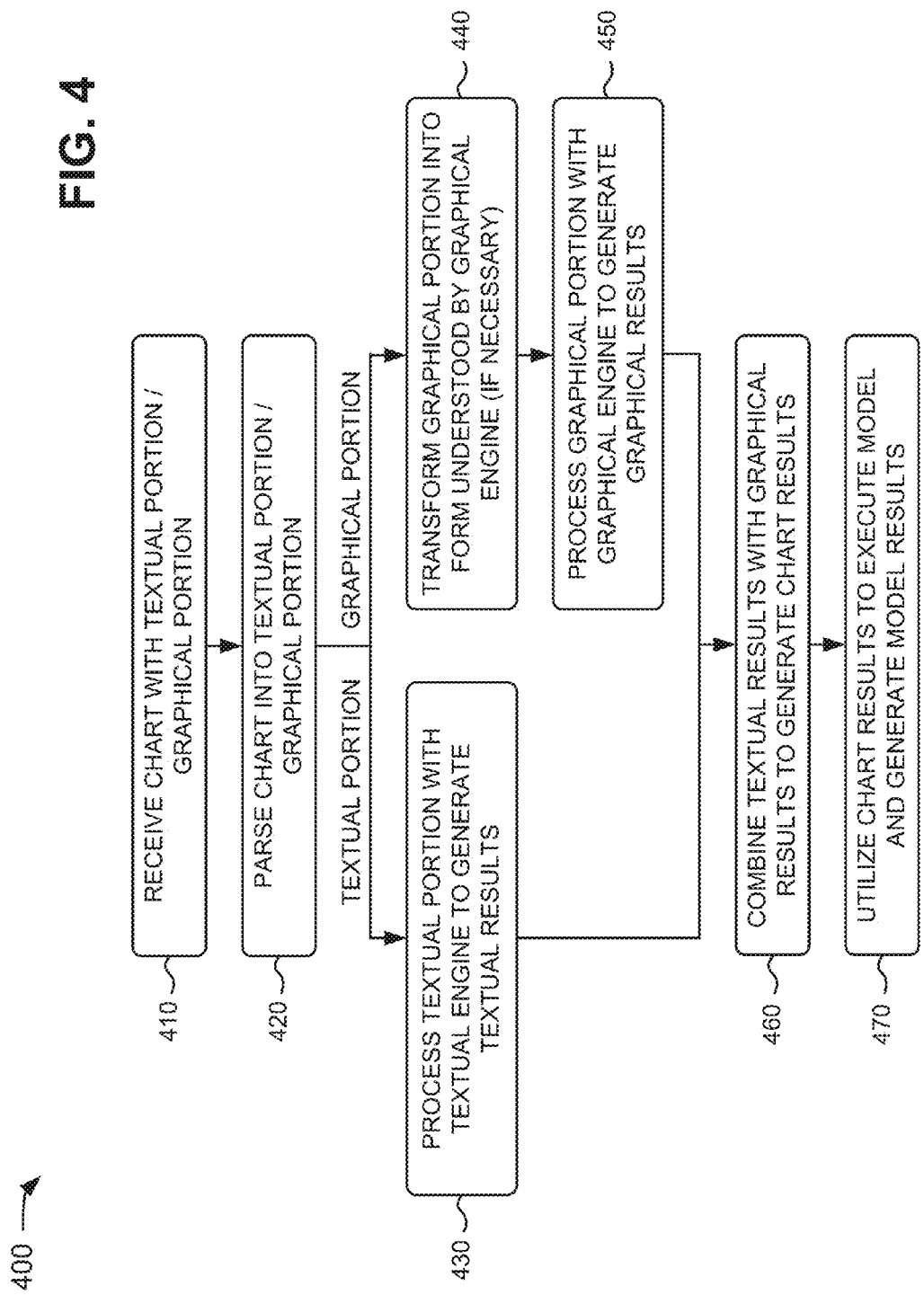

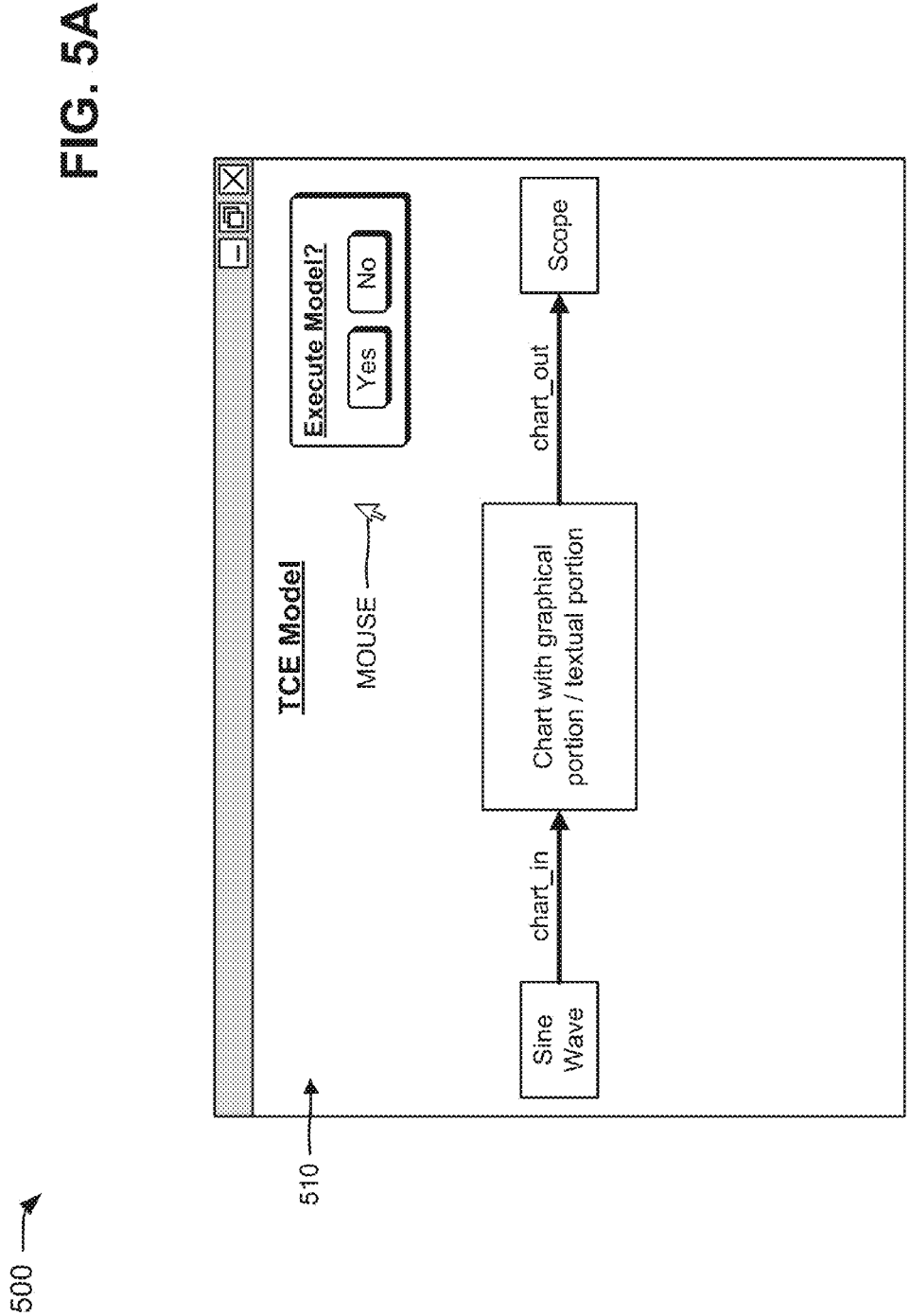

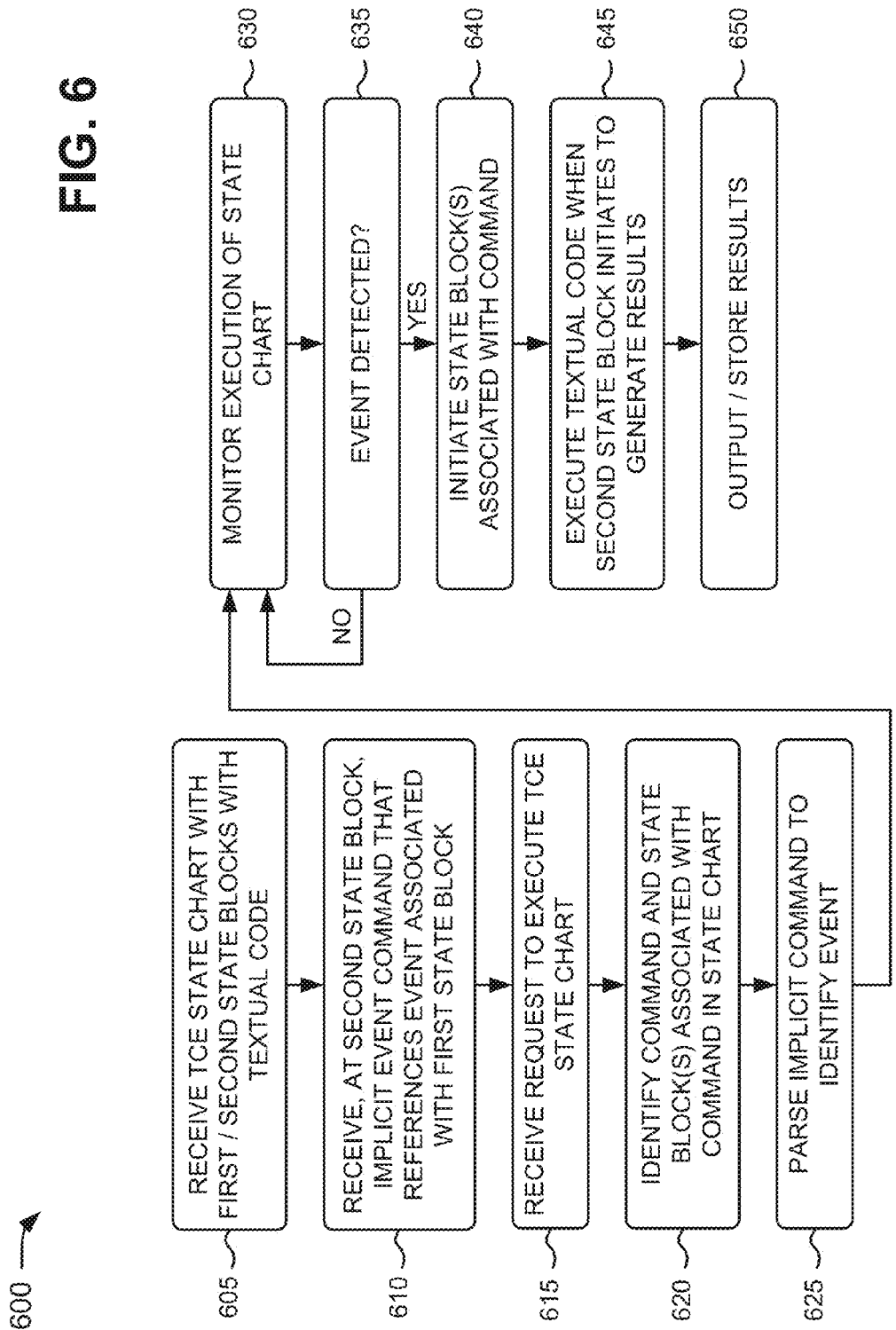

IMPLICIT EVENT BROADCAST IN A STATE CHART OF A TECHNICAL COMPUTING ENVIRONMENT

RELATED APPLICATION

This application claims priority under 35 U.S.C. § 119 based on U.S. Provisional Patent Application No. 61/827,863, filed May 28, 2013, the disclosure of which is incorporated by reference herein in its entirety.

BRIEF DESCRIPTION OF THE DRAWINGS

FIG. 3 is a diagram of example components of one or more devices of FIG. 2;

FIG. 4 is a flow chart of an example process for processing textual and graphical portions of a technical computing environment chart;

FIGS. 5A-5E are diagrams of an example relating to the example process shown in FIG. 4;

FIG. 6 is a flow chart of an example process for implicit event broadcasting in a technical computing environment state chart.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

The TCE may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc. The TCE may exist for creating computer-generated models, such as graphical behavioral models, that represent dynamic systems. A model may include a plurality of graphical objects, such as blocks or icons. A model may be executed to simulate the operation or behavior of the system being modeled. Executing the model may be referred to as simulating the model.

The TCE may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment includes an imperative or declarative language with no concept of logical, model, physical, and/or simulation time and events.

Figure 1A:
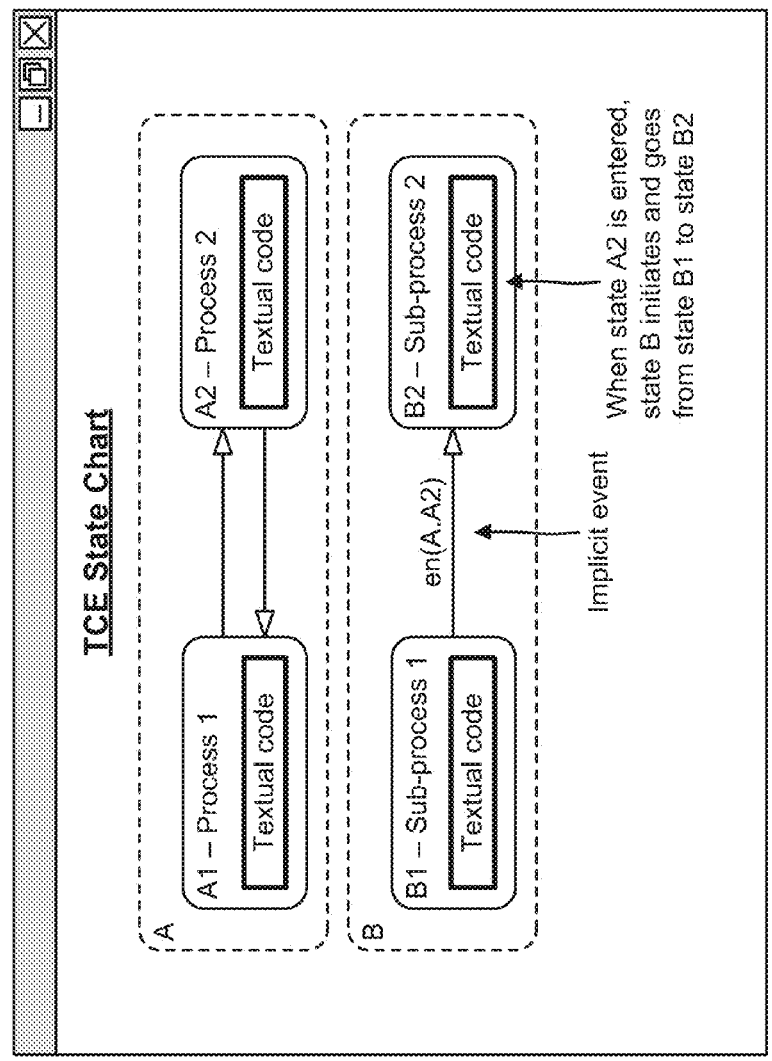
FIGS. 1A and 1B are diagrams of an overview of an example implementation described herein.
Figure 1B:
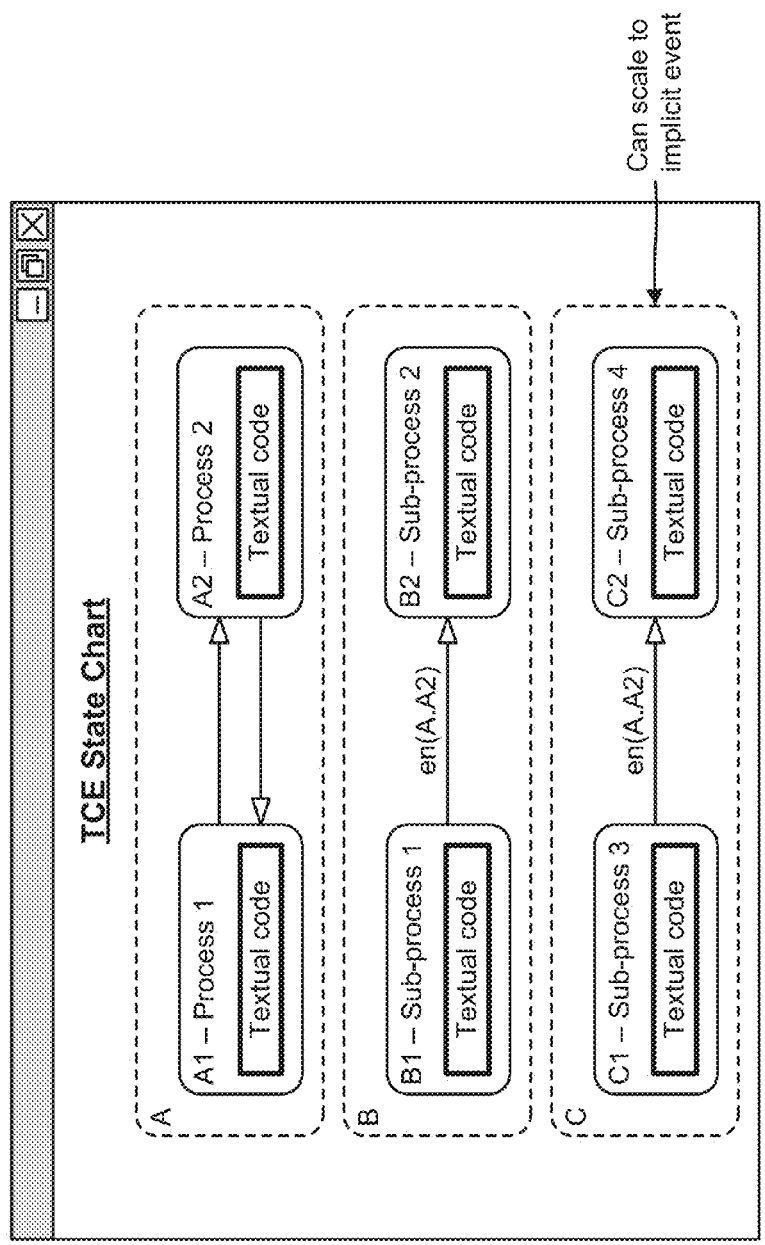

Conventional action languages for the graphical environment (e.g., Stateflow) consisted of statically-typed, scalar-based languages, such as, for example, C, C++, etc. FIGS. 1A and 1B are diagrams of an overview of an example implementation 100 described herein. In the example, a textual environment of the TCE may be provided in a graphical environment of the TCE. Time-based and event-based simulation may be introduced into the language of the textual environment, while maintaining the syntax and style of the language. The textual environment may include a language that enables users to fully define a control flow of textual code by specifying function calls and expressions. For example, a user of the textual environment may utilize conditional statements, branching, looping, and explicit function calls to define the control flow of textual code. The graphical environment may automatically generate the control flow depending on how a user refers to various variables and functions. For example, the graphical environment may enable the user to define the control flow by utilizing explicit function calls. In FIGS. 1A and 1B, the textual environment and the graphical environment may be enhanced so that a control flow may be defined with implicit function calls and/or expressions. For example, instead of specifically calling a "during action" of a state (e.g., an explicit function call), a user may "broadcast an event" to the state (e.g., an implicit function call) and the implicit function call may be automatically converted to the explicit function call (e.g., "during action").

With reference to FIG. 1A, a user may utilize a TCE of a computing device to create a state chart. The state chart may include state block A and state block B. State block A may include a representation of process steps to be performed. As further shown in FIG. 1A, state block A may include state block A1 and state block A2. State block A1 may include a representation of a first process step (e.g., Process 1), and state block A2 may include a representation of a second process step (e.g., Process 2). State block A1 and state block A2 may include textual code generated in a textual environment of the TCE. State block A1 may execute the textual code within state block A1, and state block A2 may execute the textual code within state block A2.

State block B may include a representation of sub-process steps to be performed. As further shown in FIG. 1A, state block B may include state block B1 and state block B2. State block B1 may include a representation of a first sub-process step (e.g., Sub-process 1), and state block B2 may include a representation of a second sub-process step (e.g., Sub-process 2). State block B1 and state block B2 may include textual code generated in the textual environment of the TCE. State block B1 may execute the textual code with state block B1, and state block B2 may execute the textual code within state block B2.

As further shown in FIG. 1A, an implicit event command (e.g., en(A.A2)) may be provided between state block B1 and state block B2. When the state chart is executed by the TCE, the implicit event command may cause state blocks B and B1 to be initiated when state block A2 is entered. When state block B1 is initiated, state block B2 may execute the second sub-process step, and may output results of the execution. In contrast, typical graphical environments require that the user provide an explicit event command (e.g., en: send(B.event)) in state block A2 in order to initiate state blocks B and B1. However, the explicit event command is cumbersome as it requires the user to keep track of where the event command will be generated and in which hierarchical context (e.g., which may change when the state chart is edited).

As shown in FIG. 1B, the user may further utilize the TCE to add another state block (e.g., state block C) to the state chart. State block C may include a representation of further sub-process steps to be performed. As further shown in FIG. 1B, state block C may include state block C1 and state block C2. State block C1 may include a representation of a third sub-process step (e.g., Sub-process 3), and state block C2 may include a representation of a fourth sub-process step (e.g., Sub-process 4). State block C1 and state block C2 may include textual code generated in the textual environment of the TCE. State block C1 may execute the textual code within state block C1, and state block C2 may execute the textual code within state block C2.

As further shown in FIG. 1B, another implicit event command (e.g., en(A.A2)) may be provided between state block C1 and state block C2. When the state chart is executed by the TCE, the other implicit event command may cause state blocks C and C2 to be initiated when state block A2 is entered. When state block C1 is initiated, state block C2 may execute the fourth sub-process step, and may output results of the execution. Thus, the implicit event command may provide an intuitive mechanism for a user to scale the implicit event to other state blocks of the state chart. In contrast, typical graphical environments require that the user update the explicit event command (e.g., en: send(B.event)) in state block A2, with additional information (e.g., en: send(C.event)), in order to initiate state block C. This may be cumbersome for the user and prevents scaling of the explicit event to other state blocks of the state chart.

Such an arrangement may provide a user of a TCE with an intuitive way to perform implicit function calls (e.g., implicit events) and to scale an implicit event to multiple state blocks of a state chart. The arrangement also does not require the user to remember where an explicit event is located and to update the explicit event when the user wishes to utilize the explicit event with other state blocks.

Figure 2:
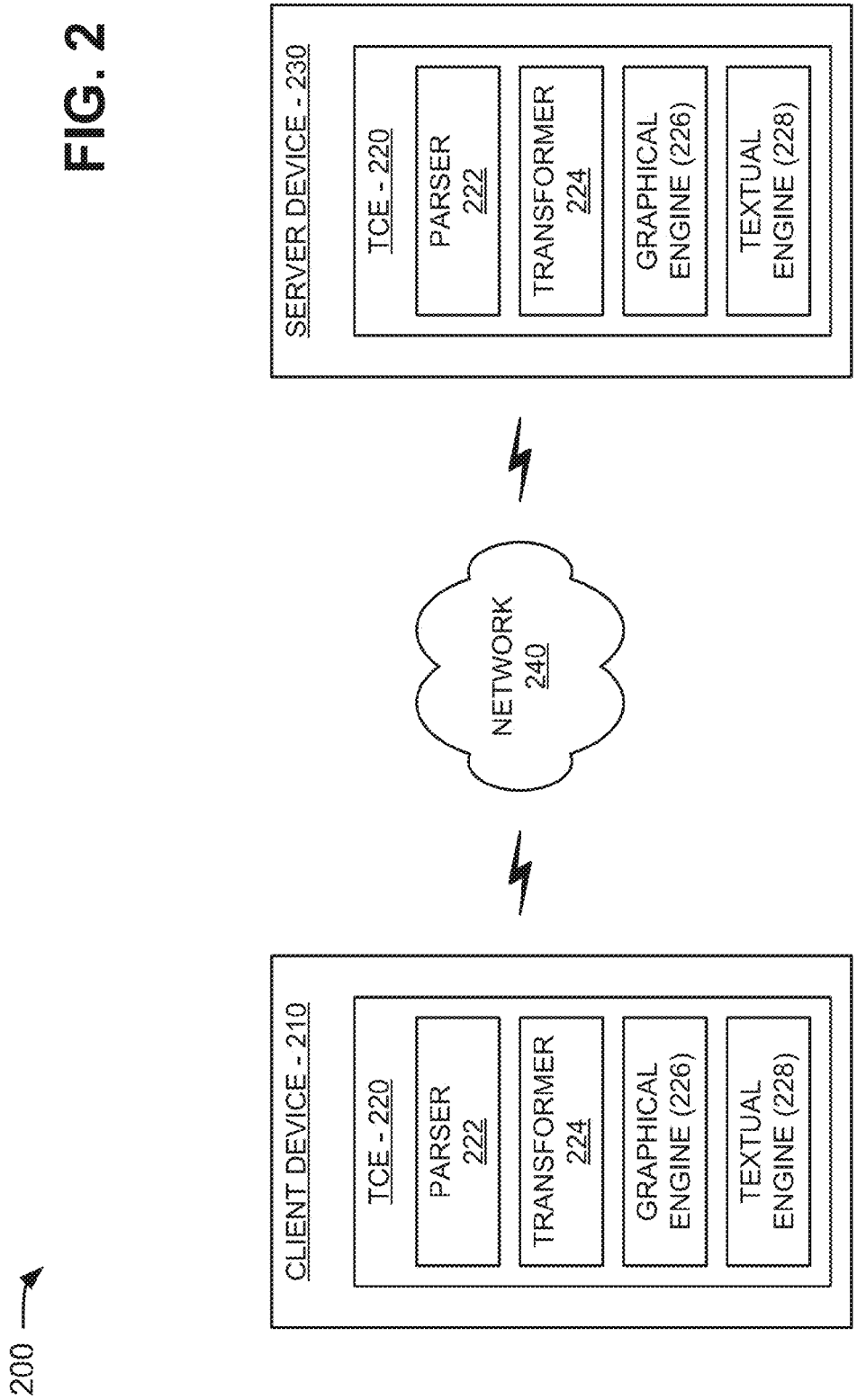
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations. A model may be declarative in that the model may not allow the user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); and a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

In some implementations, TCE 220 may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc.

In some implementations, TCE 220 may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment may include an assignment-based, imperative language with no concept of logical, model, physical, and/or simulation time and events.

In some implementations, and as further shown in FIG. 2, TCE 220 may include a parser 222, a transformer 224, a graphical engine 226, and a textual engine 228. Parser 222 may include a component that parses TCE code (e.g., a model or a chart) into a graphical portion and a textual portion. The graphical portion may include information associated with a graphical hierarchy, graphical symbols, etc. of the TCE code. The textual portion may include information associated with textual code of the TCE code that may be understood by textual engine 228. In some implementations, parser 222 may parse the textual portion into two or more portions (e.g., a time-based portion and an output portion), and may parse the graphical portion into two or more portions (e.g., a functional portion and a non-functional portion). In some implementations, parser 222 may parse TCE code into other types of portions.

Transformer 224 may include a component that receives the graphical portion of the TCE code that is not understood by graphical engine 226. For example, one or more graphical symbols may not be understood by graphical engine 226 and may be provided to transformer 224. Transformer 224 may transform the received graphical portion into a form that is understood by graphical engine 226.

Graphical engine 226 may receive the transformed graphical portion and the graphical portion that did not need to be transformed, and may process the received information. The processing of the received information may include generating graphical results, such as, for example, how a system reacts to events, time-based conditions, and external input signals. In some implementations, graphical engine 226 may include Simulink® software, Stateflow® software, Simscape™ software, and/or SimEvents® software.

Textual engine 228 may receive the textual portion, and may process the textual portion to generate textual results, such as, for example, data analysis results, matrix calculation results, array calculation results, etc. Graphical engine 226 may combine the graphical results with the textual results to generate combined results that may be understood by the graphical environment and the textual environment. In some implementations, textual engine 228 may include MATLAB software.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for processing textual and graphical portions of a technical computing environment chart. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a chart with a textual portion and a graphical portion (block 410). For example, TCE 220 may enable a user of client device 210 to create a model or to instruct client device 210 to receive the model from another source (e.g., server device 230, a CD-ROM, a flash memory, etc.). In some implementations, the model may include a chart with a graphical hierarchy of one or more chart elements (e.g., areas or regions associated with one or more states, referred to herein as "state blocks"), one or more input signals, and one or more output signals. For example, assume that a chart has state blocks A, B, and C, and that state block A includes state block B and a transition to state block C. An arrangement that includes a state block containing one or more state blocks and/or transitions to one or more state blocks may be referred to as a graphical hierarchy. Each of the chart elements may correspond to a status of a physical device, a subsystem, a model, etc. of a system being modeled (e.g., chart elements may behavioral so that a state may correspond to a status of a device, a subsystem, etc.).

In some implementations, the chart may include graphical symbols, transitions, and/or state transitions associated with the state blocks of the chart. The graphical symbols may include, for example, textual information that provides event-based conditions, time-based conditions, invariants, etc. to the state blocks, transitions, junctions, etc. In some implementations, one or more of the state blocks, transitions, and/or state transitions, may include textual code that may be understood and processed by textual engine 228 of TCE 220. The textual code may include, for example, one or more functions, matrices, data, etc. that may be understood and processed by textual engine 228.

In some implementations, TCE 220 may cause client device 210 to display a user interface so that the user may create and/or view the model and the chart. For example, the user may utilize the user interface to create the state blocks for the chart, and to connect the state blocks together. The user may associate the graphical symbols with the state blocks and/or other elements of the chart (e.g., transitions, state transitions, junctions, etc.), and may add the textual code in the one or more state blocks. The user may utilize the user interface to provide the chart within the model.

As further shown in FIG. 4, process 400 may include parsing the chart into a textual portion and a graphical portion (block 420). For example, parser 222 of TCE 220 may receive information associated with the chart, and may identify, based on the information, a portion of the chart that may be understood and processed by textual engine 228 (e.g., a textual portion) and a portion of the chart that may be understood and processed by graphical engine 226 (e.g., a graphical portion). In some implementations, parser 222 may have access to a data structure (e.g., a database) that stores syntax associated with the language of the textual environment of TCE 220 (e.g., and understood by textual engine 228). Parser 222 may compare the chart information with the syntax stored in the data structure, and may determine that particular portions of the chart information match the syntax. Parser 222 may designate the matching portions of the chart information as the textual portion. For example, parser 222 may designate functions, arrays, matrices, algorithms, etc. in the chart as the textual portion.

In some implementations, parser 222 may have access to a data structure (e.g., a database) that stores information associated with the graphical environment of TCE 220 (e.g., and understood by graphical engine 226). Parser 222 may compare the chart information with information stored in the data structure, and may determine that particular portions of the chart information match the information in the data structure. Parser 222 may designate the matching portions of the chart information as the graphical portion. For example, parser 222 may designate time-based conditions, event-based conditions, other conditions, hierarchy information, etc. as the graphical portion.

As further shown in FIG. 4, for the textual portion (block 420—TEXTUAL PORTION), process 400 may include processing the textual portion with the textual engine to generate textual results (block 430). For example, parser 222 may provide the textual portion of the chart to textual engine 228, and textual engine 228 may process the textual portion of the chart to generate textual results. In some implementations, textual engine 228 may execute the textual portion of the chart to generate the textual results. For example, assume that the textual portion of the chart includes a function for performing matrix calculations on data. In such an example, textual engine 228 may execute the function so that the matrix calculations are performed on the data. The matrix resulting from the calculations may be referred to as textual results. In another example, assume that the textual portion of the chart includes an algorithm for performing data analysis. In this example, textual engine 228 may execute the algorithm so that the data analysis is performed. The results of the data analysis may be referred to as textual results.

As further shown in FIG. 4, for the graphical portion (block 420—GRAPHICAL PORTION), process 400 may include transforming, if necessary, the graphical portion into a form understood by the graphical engine (block 440). For example, parser 222 may determine whether any of the graphical portion of the chart will not be understood by graphical engine 226. In some implementations, parser 222 may identify text in the graphical portion that may not be understood by graphical engine 226. For example, assume that the graphical portion includes the text before(abs(a*eig(b(1:10, 1:10))), sec), and that graphical engine 226 does not understand the text since graphical engine 226 needs to calculate a time to execute the text. In this example, parser 222 may provide the text to transformer 224, and transformer 224 may transform the text into a form understood by graphical engine 226. For example, transformer 224 may transform the text to utilize counters maintained by the graphical environment (e.g., Simulink) so that a time (e.g., one second, two seconds, etc.) may be calculated by graphical engine 226. In some implementations, transformer 224 may provide the transformed text to graphical engine 226 for processing. In some implementations, the text provided in the graphical portion may include textual operations (e.g., after(abs(a*eig(b(1:10, 1:10))), sec)) that are understood by the textual environment, such as, for example, TCE operations.

In some implementations, parser 222 may provide the remaining graphical portion (e.g., which may be understood by graphical engine 226) directly to graphical engine 226. In some implementations, parser 222 may determine that all of the graphical portion may be understood by graphical engine 226. In such a situation, parser 222 may provide the entire graphical portion to graphical engine 226 and transformer 224 may not be utilized.

As further shown in FIG. 4, for the graphical portion (block 420—GRAPHICAL PORTION), process 400 may include processing the graphical portion with the graphical engine to generate graphical results (block 450). For example, parser 222 may provide, to graphical engine 226, the graphical portion of the chart that is understood by graphical engine 226. Transformer 224 may provide, to graphical engine 226, any of the graphical portion that has been transformed into a form that is understood by graphical engine 226. Graphical engine 226 may process the graphical portion of the chart to generate graphical results. In some implementations, graphical engine 226 may execute the graphical portion of the chart to generate the graphical results. For example, assume that the graphical portion of the chart includes instructions to combine graphical and tabular representations. In such an example, graphical engine 226 may execute the instructions so that the graphical and tabular representations are combined. The resulting combination may be referred to as graphical results. In another example, assume that the graphical portion of the chart includes an event-based condition (e.g., transition to state block A when a function is calculated). In this example, graphical engine 226 may execute the event-based condition so that state block A is transitioned to. The results of the execution of the event-based condition may be referred to as graphical results. In some implementations, graphical engine 226 may execute textual information.

As further shown in FIG. 4, process 400 may include combining the textual results with the graphical results to generate chart results (block 460). For example, TCE 220 may combine the textual results, generated by textual engine 228, with the graphical results generated by graphical engine 226 to generate chart results. In some implementations, the chart results may include results associated with execution of the chart. For example, assume that the textual results include a calculation of a function bar and that the graphical results include utilizing the calculation when a state block B is transitioned to. In such an example, the chart results may include transitioning to state block B and utilizing the calculation of the function bar. In another example, assume that the textual results include performing a matrix calculation and that the graphical results include computing the time period based on the array-based computations. In such an example, the chart results may include determining when the time period has expired and utilizing the matrix calculation after the time period has expired and/or utilizing the matrix calculation to determine the time period. In some implementations, the chart may model reactive systems via state machines and flow charts within a model. In some implementations, the chart may use a variant of a finite-state machine notation, which may enable representation of hierarchy, parallelism, event broadcast, and/or history within the chart. In some implementations, the chart may provide state transition tables and/or truth tables. In some implementations, the chart may represent discrete modes of a system by a state, may control how a system responds to faults and failures within the system, and may schedule when specific tasks occur (e.g., either within the chart or within an overall model).

As further shown in FIG. 4, process 400 may include utilizing the chart results to execute the model and generate model results (block 470). For example, TCE 220 may utilize the chart results in the model (e.g., during execution of the model) to generate model results. In some implementations, the model results may include results associated with execution of the model based on the chart results. For example, assume that the chart results include transitioning to state block B and utilizing a calculation of a function bar. After state block B is transitioned to and the function bar is calculated, TCE 220 may utilize the function calculation in the model to generate the model results. In another example, assume that the chart results include determining when a time period has expired and utilizing the computations to determine the time period. After the matrix calculation is performed, TCE 220 may utilize the matrix calculation in the model to generate the model results and/or to determine the time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
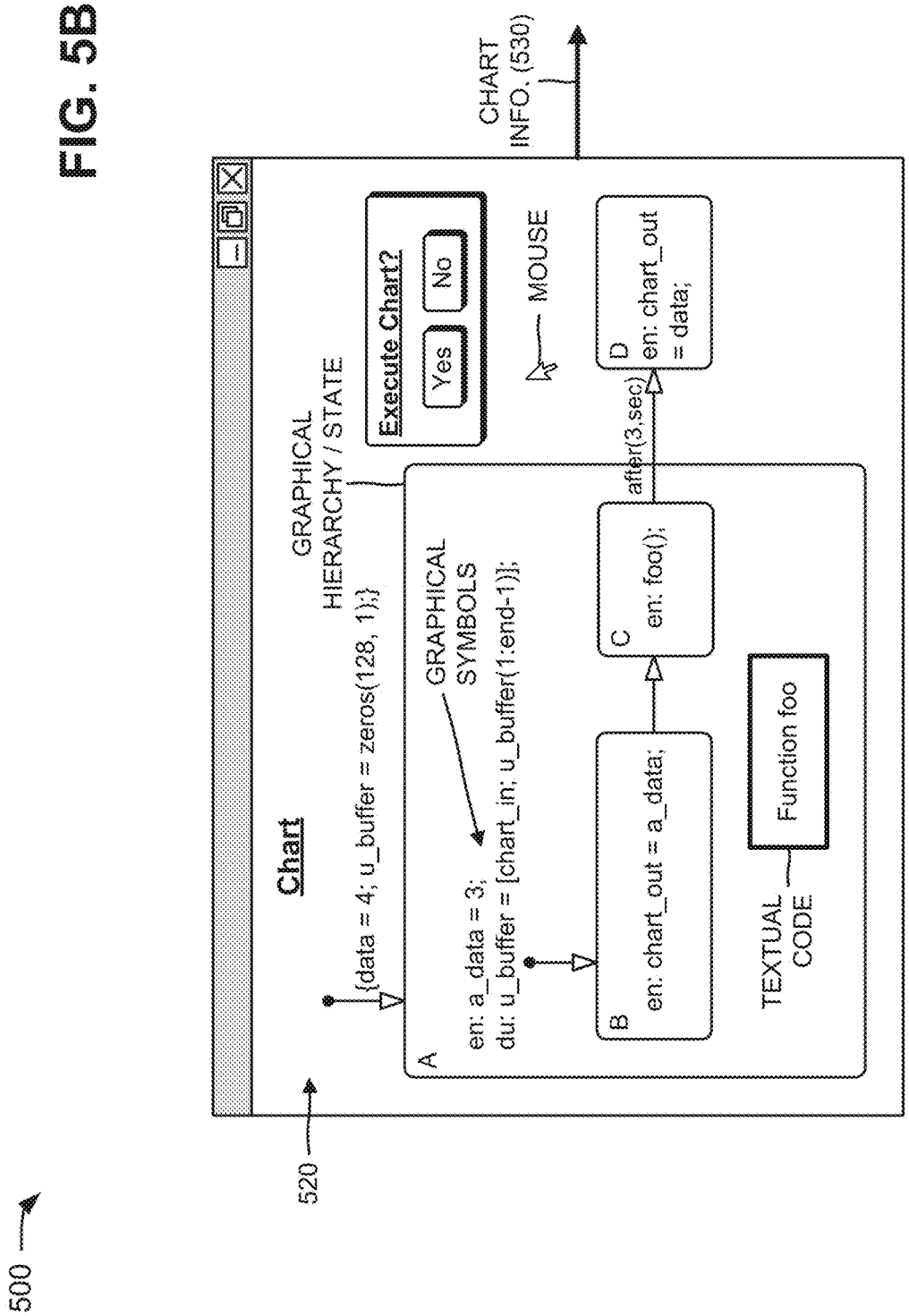

FIGS. 5A-5E are diagrams of an example 500 relating to example process 400 shown in FIG. 4. In example 500, assume that a user of client device 210 utilizes TCE 220 to create a model or to import the model into TCE 220. As shown in FIG. 5A, TCE 220 may cause client device 210 to display the model in a user interface 510. The model may include a sine wave block, a chart block, and a scope block.

The sine wave block may include a representation of a sine wave that is to be displayed by the scope block. In example 500, assume that the sine wave block provides a chart_in signal (e.g., a sine wave signal) to the chart block. The chart block may include a representation of a chart that processes the sine wave signal so that it may be understood by the scope block. The chart block may include a graphical portion and a textual portion. The chart block may receive the chart_in signal, and may process the chart_in signal to produce a chart_out signal (e.g., a voltage/time signal to be displayed by the scope block). The chart block may provide the chart_out signal to the scope block. The scope block may include a representation of an oscilloscope that displays constantly varying signal voltages as a function of time. The scope block may receive the chart_out signal, and may display the signal (e.g., a voltage/time signal). In some implementations, the chart block may include a chart (FIG. 5B) that may be executed based on different execution semantics provided by a user and/or inferred from the model. The execution semantics may include dynamic notions associated with continuous time for example, computing the time derivatives of a dynamic system based on matrix calculations, etc. In some implementations, the chart may be provided in an environment that includes multiple domains.

As further shown in FIG. 5A, TCE 220 may instruct client device 210 to display an option to execute the model. For example, user interface 510 may display a window or some other display mechanism that requests whether the user wants to execute the model. If the user elects to execute the model (e.g., via selection of a "Yes" button with a mouse or other selection mechanism), TCE 220 may execute the model. In some implementations, the user may select a "Play" button with the mouse, and TCE 220 may execute the model. In order to execute the model, assume that TCE 220 needs to execute the chart block, as shown in a user interface 520 of FIG. 5B. In some implementations, the model may include computational semantics associated with graphical and textual elements, and may include computational semantics associated with various blocks in the model. In some implementations, TCE 220 may debug the model before or during execution of the model or generation of code.

As shown in user interface 520, the chart may include a graphical hierarchy of state blocks A, B, C, and D. The graphical hierarchy may include the arrangement of the state blocks in the chart. For example, state block A may be transitioned to first, state block B may be transitioned to second, state block C may be transitioned to third, and state block D may be transitioned to last. The state blocks may include state information provided by graphical symbols. For example, state block A may include the graphical symbols en: a_data=3 and du: u_buffer=[chart_in; u_buffer (1:end−1)] (e.g., which may be parsed by graphical engine 226 into a portion "du" that may be understood by graphical engine 226 and another portion "u_buffer=[chart_in; u_buffer(1:end−1)]" that may be understood by textual engine 228); state block B may include the graphical symbols en: chart_out=a_data; state block C may include the graphical symbols en: foo( ) and state block D may include the graphical symbols en: chart_out=data. Some or all of the graphical hierarchy, state blocks A, B, C, and D, and the graphical symbols may be understood by graphical engine 226. State block A may also include textual code (e.g., a function foo) that may be understood by textual engine 228. In some implementations, the textual code may include text for a function (e.g., foo, bar, etc.), text for a matrix (e.g., C=[1, 2, 3]), array-based text, dynamically-typed text, dynamic assignments, script or function name spaces, etc. (e.g., text that ignores certain output arguments, a function with logic that involves a caller's number of output arguments, fixed point quantities that use integer containers to specify approximate floating point values). In some implementations, graphical engine 226 may execute graphical code and textual code (e.g., C code), but may not execute dynamically-typed and/or array-based code. In some implementations, textual engine 228 may execute the dynamically-typed, array-based code.

As further shown in FIG. 5B, when the chart wakes up, the default transitions of the chart may be executed. For example, an action in a default transition (e.g., {data=4; u_buffer=zeros(128, 1);}) may be executed, and state block A may be marked as active. Graphical symbols of state block A (e.g., an entry action en: a_data=3) may be executed, and default transitions inside state block A may be executed to establish an active child of state block A (e.g., mark state block B as active). Graphical symbols of state block B (e.g., an entry action en: chart_out=a_data) may be executed, and the chart execution may be complete (e.g., the chart may go to sleep) since no child states remain. When the chart sleeps, state blocks A and B may be active. A next time the chart wakes up, graphical symbols of state block A (e.g., the during action du: u_buffer=[chart_in; u_buffer(1:end−1)]) may be executed since there are no direct outer transitions of state block A. Outer transitions of state block B may be checked, and, since there is no condition, the transition to state block C may be assumed to be true. Therefore, the chart may transition from state block B to state block C. State block C may become active and state block A may remain active. The chart may keep waking up according to solver settings and/or system dynamics, and may wake up many times or a few times. Every time the chart wakes up, the outer transitions of all active state blocks may be checked, for example, in a top-down manner. If an outer transition of a particular state block is not true, a during action of the particular state block may be executed. Otherwise, a transition may occur to a next state block. This may result in one or more executions of the during action of state block A (e.g., du: u_buffer=[chart_in; u_buffer(1:end−1)]).

At some point, the chart may wake up, with a condition specified in an outer transition of state block C (e.g., after(3, sec)) being true, after state block C is first entered. When this condition is true, a transition from state block C may occur. State block C may be marked as inactive when state block C is exited. State block A may be marked as inactive since the outer transition of state block C (e.g., after(3, sec)) leaves a graphical boundary of state block A. State block C may transition to state block D, and state block D may be marked as active. At this time, only state block D may be active in the chart. Graphical symbols of state block D (e.g., an entry action en: chart_out=data) may be executed at this time.

As further shown in FIG. 5B, TCE 220 may instruct client device 210 to display an option to execute the chart or may automatically execute the chart when the model is executed. For example, user interface 520 may display a window or some other display mechanism that requests whether the user wants to execute the chart. If the user elects to execute the chart (e.g., via selection of a "Yes" button with a mouse or other selection mechanism), TCE 220 may execute the chart to generate chart information 530, as further shown in FIG. 5B. Chart information 530 may include information associated with the graphical hierarchy, state blocks A, B, C, and D, the graphical symbols, the textual code, and/or execution of the graphical hierarchy, state blocks A, B, C, and D, the graphical symbols, and/or the textual code. In some implementations, the chart may be executed based on conditions in a model (e.g., a time-based block diagram model). For example, if a temperature in a model of an HVAC system exceeds a certain value (e.g., at a particular time), a status of a heater device may change from on to off.

In some implementations, TCE 220 may begin searching at a lowest level of the graphical hierarchy for data and/or a function and move up the graphical hierarchy level by level until the data/function is found. In some implementations, TCE 220 may include a global or logical workspace that may be searched first or last, for example, for data and/or a function. In some implementations, TCE 220 may execute the chart by executing one or more transitions, by executing in microsteps, by executing all events and actions at a hierarchical level, etc. Each microstep may result in a set of transitions that result in a stable state configuration (e.g., the result of one state chart execution). A state machine may continue to execute microsteps until no state transitions are possible from a current state configuration.

Figure 5C:
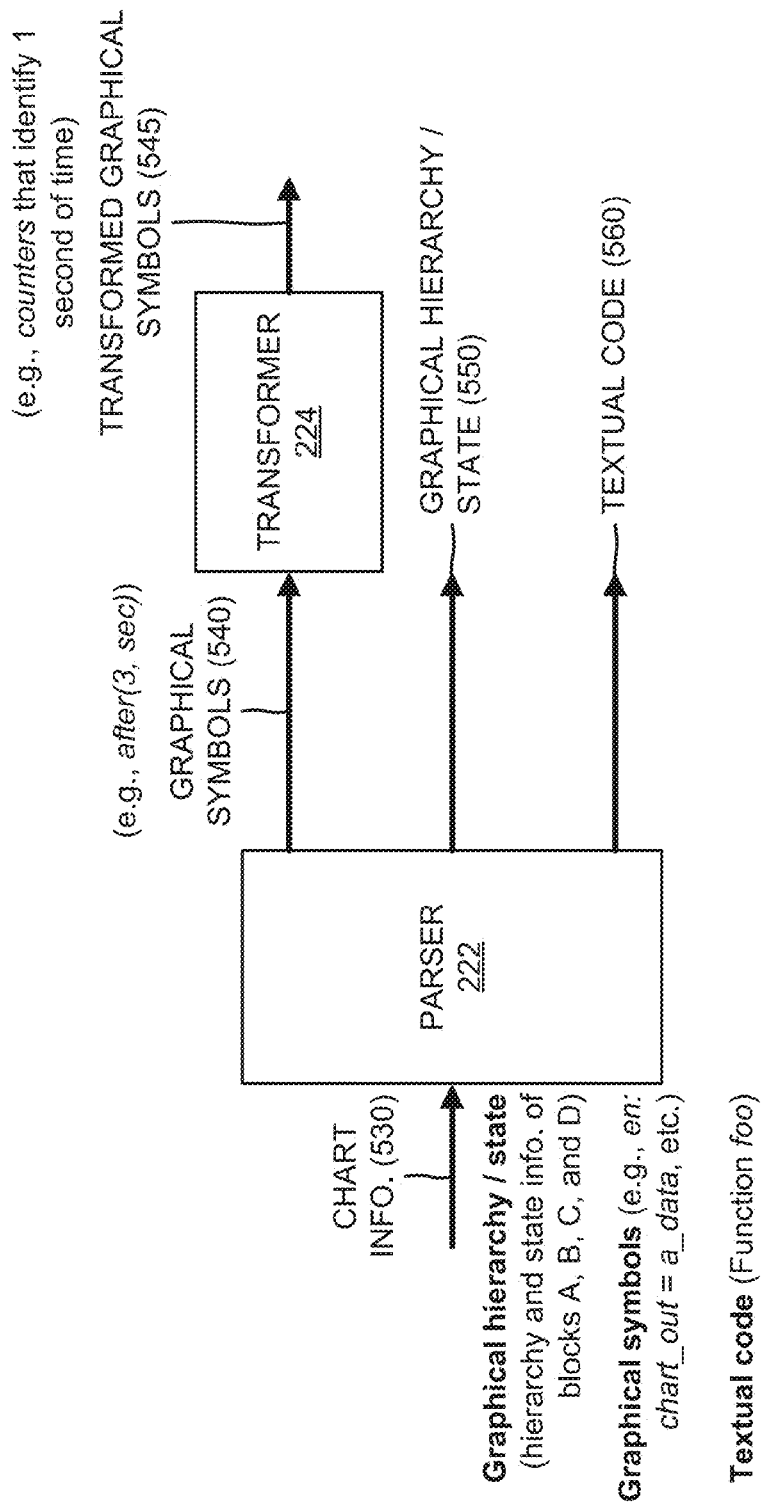

As shown in FIG. 5C, assume that TCE 220 provides chart information 530 to parser 222. For example, TCE 220 may provide, to parser 222, the information associated with the graphical hierarchy and the state of the chart (e.g., the hierarchy and active state information of state blocks A, B, C, and D); the information associated with the graphical symbols (e.g., chart_out=data, after(3, sec), etc.); the information associated with the textual code (e.g., the function foo); and/or the execution of the graphical hierarchy, state blocks A, B, C, and D, the graphical symbols, and/or the textual code. Parser 222 may parse chart information 530 into information 540 associated with graphical symbols that are not understood by graphical engine 226; information 550 associated with the graphical hierarchy and state blocks A, B, C, and D; and information 560 associated with the textual code.

Information 540 may not be generated if all of the graphical symbols, in chart information 530, are understood by graphical engine 226. In such a situation, parser 222 may provide information 540 associated with the graphical symbols directly to graphical engine 226. In one example, information 540 may include the text after(3, sec) or after (abs(a*eig(b(1:10, 1:10))), sec), which may not be understood by graphical engine 226 since graphical engine 226 does not understand TCE language syntax (e.g., abs(a*eig (b))). In this example, parser 222 may provide the text to transformer 224, and transformer 224 may transform the text into a form understood by graphical engine 226 (e.g., transformed graphical symbols 545, as shown in FIG. 5C). For example, transformer 224 may transform the text to utilize counters maintained by the graphical environment (e.g., Simulink) so that a time (e.g., one second, two seconds, etc.) may be calculated by graphical engine 226. Information 550 associated with the graphical hierarchy and state blocks A, B, C, and D may include, for example, the hierarchy and state information of state blocks A, B, C, and D, information identifying that state A is a parent state for state B, etc. Information 560 associated with the textual code may include, for example, information associated with the function foo.

Figure 5D:
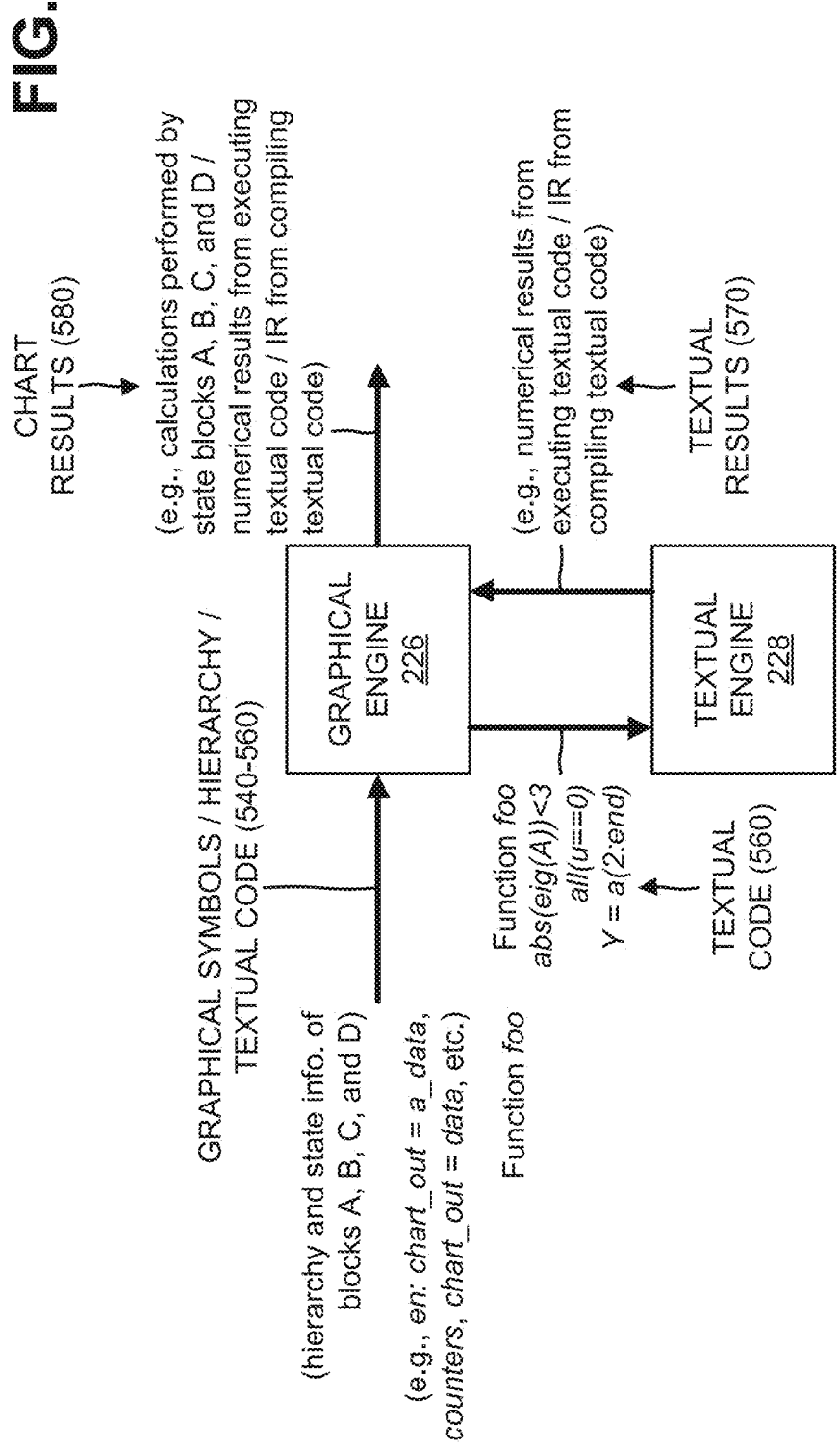

As shown in FIG. 5D, graphical engine 226 may receive information 540 associated with graphical symbols (e.g., chart_out=a_data), transformed graphical symbols 545 (e.g., counters), information 550 associated with the graphical hierarchy and state (e.g., the hierarchy and state information of state blocks A, B, C, and D), and information 560 associated with the textual code (e.g., the functions foo, abs(eig(A))<3, all(u==0), and Y=a(2:end)). In some implementations, information 560 associated with the textual code may include zero crossing detection and location information, for example, to determine when discrete events occur.

Graphical engine 226 may provide information 560 associated with textual code to textual engine 228. Textual engine 228 may process information 560 to generate textual results 570. In example 500, assume that textual results 570 include numerical results from executing the textual code (e.g., the function foo) and/or an intermediate representation (IR) from compiling the textual code. Textual engine 228 may provide textual results 570 to graphical engine 226. Graphical engine 226 may process information 540, transformed graphical symbols 545, information 550, and textual results 570 to generate chart results 580. In example 500, assume that chart results 580 include the calculations performed by one or more of state blocks A, B, C, and/or D, numerical results from executing the textual code (e.g., the function foo), and/or an intermediate representation (IR) from compiling the textual code.

Figure 5E:
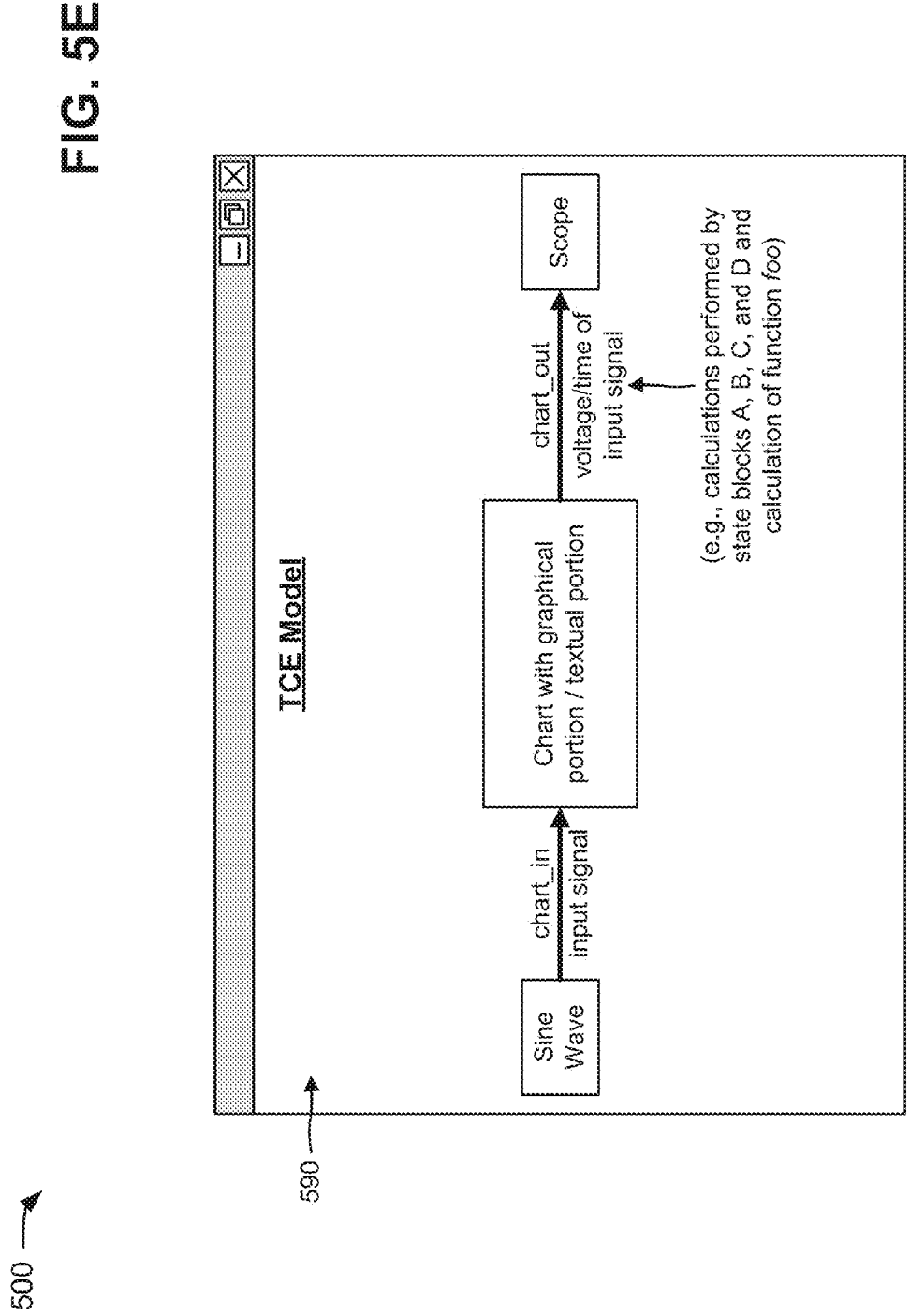

After one or more portions of the chart are executed and chart results 580 are generated, TCE 220 may utilize chart results 580 to execute the model. For example, as described above in connection with FIG. 5B, the chart may wake up and execute one or more of state blocks A, B, C, and D. In some implementations, the chart may execute one or more portions of a model and/or the model may execute one or more portions of the chart. As shown in FIG. 5E, TCE 220 may cause client device 210 to display a user interface 590 that includes the executed model. As shown in user interface 590, the chart block may receive an input signal (e.g., a sine wave) from the sine wave block, and may output a voltage/time signal, based on the input signal, to the scope block. As further shown, the voltage/time signal may correspond to the calculations performed by state blocks A, B, C, and/or D and/or the calculation of the function foo.

As indicated above, FIGS. 5A-5E are provided merely as an example. Other examples are possible and may differ from what was described with regard to FIGS. 5A-5E.

FIG. 6 is a flow chart of an example process 600 for implicit event broadcasting in a technical computing environment state chart. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a TCE state chart that includes first and second state blocks with textual code (block 605). For example, TCE 220 may cause client device 210 to display a user interface to a user of client device 210. The user interface may include mechanisms (e.g., menus, buttons, icons, libraries, etc.) that enable the user to create a state chart for TCE 220. In some implementations, the user may wish to create a state chart with one or more chart elements (e.g., state blocks), one or more input signals, and one or more output signals. Each of the chart elements may be associated with a state of a physical device, a subsystem, another model, etc. of a system being modeled. In some implementations, the state chart may include textual code provided by the textual environment and associated with the one or more chart elements.

In some implementations, the user of client device 210 may utilize TCE 220 to import the state chart into TCE 220 from memory (e.g., memory 330 or storage component 340) of client device 210. In some implementations, the user of client device 210 may utilize TCE 220 to import the state chart into TCE 220 from another source, such as, for example, server device 230 or an external memory device (e.g., a CD-ROM, a flash memory, etc.).

As further shown in FIG. 6, process 600 may include receiving, at the second state block, an implicit event command that references an event associated with the first state block (block 610). For example, the user may utilize the user interface to provide a first state block and second state block in the state chart, and to provide an implicit event command at the second state block. In some implementations, the implicit event command may include a reference to the first state block. For example, the state chart may include a state block A that is separate from a pair of state blocks B1 and B2. The user may provide the implicit event command at a transition between state block B1 and state block B2.

Unlike explicit event commands that specifically identify a state block (e.g., to explicitly determine a state that generates an event) that is to be affected by the command, implicit event commands may simply identify the event. Thus, a particular implicit event command can be used in multiple locations in a state chart. For example, the implicit event command may be used in several state blocks when there is no explicit "owner" of the event (e.g., similar to an explicit event). There may be several locations within a state chart that are listening for an event (e.g., en(A)), and when state A is entered, the several locations of the state chart may be executed.

In some implementations, the implicit event command may include syntax of a general form:

implicit(event), where implicit may correspond to the command and event may correspond to the event. In some implementations, the implicit event command may include a function call that is executed by a state block when an event occurs (e.g., when another state block performs a function). For example, if the implicit event command includes the syntax en(A) provided at the transition from state block B1 to state block B2, the implicit event command may cause a transition from state block B1 to state block B2 when state block A is entered and state block B1 is active. In another example, assume that state block A calculates a function foo and that state block B1 calculates another function bar. Further, assume that the implicit event command includes the syntax B1(foo=10). In this example, the implicit event command may cause state block B1 to initiate and call function bar when an event occurs (e.g., when function foo returns a value equal to ten).

In some implementations, the implicit event command may include multiple function calls that are executed by one or more state blocks when one or more events occur in one or more other state blocks. For example, assume that state block A calculates a function foo, that state block B1 calculates a function bar1, and that state block B2 calculates a function bar2. Further, assume that the implicit event command includes the syntax A(bar1=5 and bar2=3). In this example, the implicit event command may cause state block A to initiate and calculate function foo when function bar1 returns a value of five and function bar2 returns a value of three.

As further shown in FIG. 6, process 600 may include receiving a request to execute the TCE state chart (block 615). For example, the user may instruct TCE 220 to execute the state chart, and TCE 220 may execute the state chart based on the user's instructions. In some implementations, TCE 220 may execute the state chart when the user inputs a command or selects a display mechanism (e.g., a button, a menu item, etc.) that instructs TCE 220 to execute the state chart. For example, TCE 220 may cause client device 210 to display an Execution button in the user interface. When the user selects the Execution button, the selection may cause TCE 220 to execute the state chart. In another example, TCE 220 may cause client device 210 to display a command window in the user interface. The user may enter a command (e.g., "execute state chart") in the command window, and TCE 220 may execute the state chart based on the entered command.

As further shown in FIG. 6, process 600 may include identifying the implicit event command and state block(s) associated with the implicit event command in the state chart (block 620). For example, when TCE 220 executes the state chart, TCE 220 may identify, in the state chart, one or more implicit event commands and state blocks associated with the implicit event command. In some implementations, TCE 220 may identify an implicit event command that includes the syntax en(A) provided at the transition between state block B1 and state block B2, and may identify state blocks A, B1, and B2 are being associated with the implicit event command. In some implementations, TCE 220 may search the state chart for commands that include syntax associated with implicit event commands, and may identify the implicit event commands based on the search.

As further shown in FIG. 6, process 600 may include parsing the implicit event command to identify the event (block 625). For example, if TCE 220 identifies an implicit event command in the state chart, TCE 220 may parse the implicit event command to identify an event associated with the command. In some implementations, TCE 220 may divide the implicit event command to identify the syntax associated with the command (e.g., command) and the event (e.g., event). In some implementations, if TCE 220 identifies an implicit event command that includes the syntax en(A), TCE 220 may parse the implicit event command to identify an event (e.g., entering state block A) associated with the implicit event command. In some implementations, if TCE 220 identifies an implicit event command that includes the syntax B1(foo=10), TCE 220 may parse the implicit event command to identify an event (e.g., when function foo returns a value of ten) associated with the implicit event command.

As further shown in FIG. 6, process 600 may include monitoring execution of the state chart (block 630). For example, TCE 220 may monitor the execution of the state chart in order to detect an occurrence of the event identified in the implicit event command. In some implementations, TCE 220 may monitor events (e.g., performance of a function, entering a state block, etc.) associated with the execution of the state chart. TCE 220 may compare the monitored events with the event identified in the implicit event command to determine whether any of the monitored events matches the event identified in the implicit event command. If a monitored event matches the event identified in the implicit event command, TCE 220 may detect the event.

As further shown in FIG. 6, process 600 may include determining whether the event is detected (block 635). For example, TCE 220 may determine whether the event identified in the implicit event command is detected. In some implementations, if the entry of the first state block is the event referenced by the implicit event command, TCE 220 may detect the event when the first state block is entered. If the first state block is not entered, TCE 220 may not detect the event. In some implementations, if performance of a function referenced by the first state block is the event referenced by the implicit event command, TCE 220 may detect the event when the function is performed and may not detect the event when the function is not performed. For example, if the implicit event command includes the syntax en(A) provided at the transition between state block B1 and state block B2, entry of state block A may be the event referenced by the implicit event command. In another example, assume that state block A calculates a function foo and that state block B1 calculates another function bar. Further, assume that the implicit event command includes the syntax B1(A(foo=10)). In this example, calculation of function foo and when function foo returns a value of ten may be the event referenced by the implicit event command.

As further shown in FIG. 6, if the event is not detected (block 635—NO), process 600 may return to process block 630. If the event is detected (block 635—YES), process 600 may include initiating state block(s) associated with the implicit event command (block 640). For example, if TCE 220 does not detect the occurrence of the event, TCE 220 may continue monitoring the execution of the state chart in order to detect an occurrence of the event. If TCE 220 detects the occurrence of the event (e.g., when the first state block is entered, when a function is performed, etc.), TCE 220 may wake up the state block(s) associated with the implicit event command. For example, if the implicit event command includes the syntax en(A) provided at the transition between state block B1 and state block B2, the implicit event command may cause TCE 220 to wake up state block B1 and transition to state block B2 when state block A is entered. In another example, assume that state block A calculates a function foo and that state block B1 calculates another function bar. Further, assume that the implicit event command includes the syntax B1(A(foo=10)). In this example, the implicit event command may cause TCE 220 to wake up state block B1 when state block A calculates function foo as returning a value of ten.

As further shown in FIG. 6, process 600 may include executing the textual code, provided in the second state block, when the second state block initiates or becomes active (block 645). For example, if TCE 220 wakes up the second state block based on the implicit event command, TCE 220 may execute the textual code provided in the second state block. In some implementations, graphical engine 226 may perform one or more of the aforementioned functions associated with process 600, and textual engine 228 may execute the textual code provided in the second state block. For example, assume that state block A calculates a function foo, that state block B1 calculates a function bar1, and that state block B2 calculates a function bar2. Further, assume that the implicit event command includes the syntax A(bar1=5 and bar2=3). In this example, the implicit event command may cause graphical engine 226 to wake up state block A and textual engine 228 to calculate function foo when function bar1 equals five and function bar2 equals three.

As further shown in FIG. 6, process 600 may include outputting or storing results of the execution of the textual code (block 650). For example, TCE 220 may cause client device 210 to display, to the user, the results of the execution of the textual code. In some implementations, TCE 220 may cause client device 210 to store the results in memory (e.g., memory 330, storage component 340, etc.) associated with client device 210 and/or server device 230. In some implementations, TCE 220 generate output code based on the results, and may cause client device 210 to embed the output code in a physical device (e.g., a robot, manufacturing equipment, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
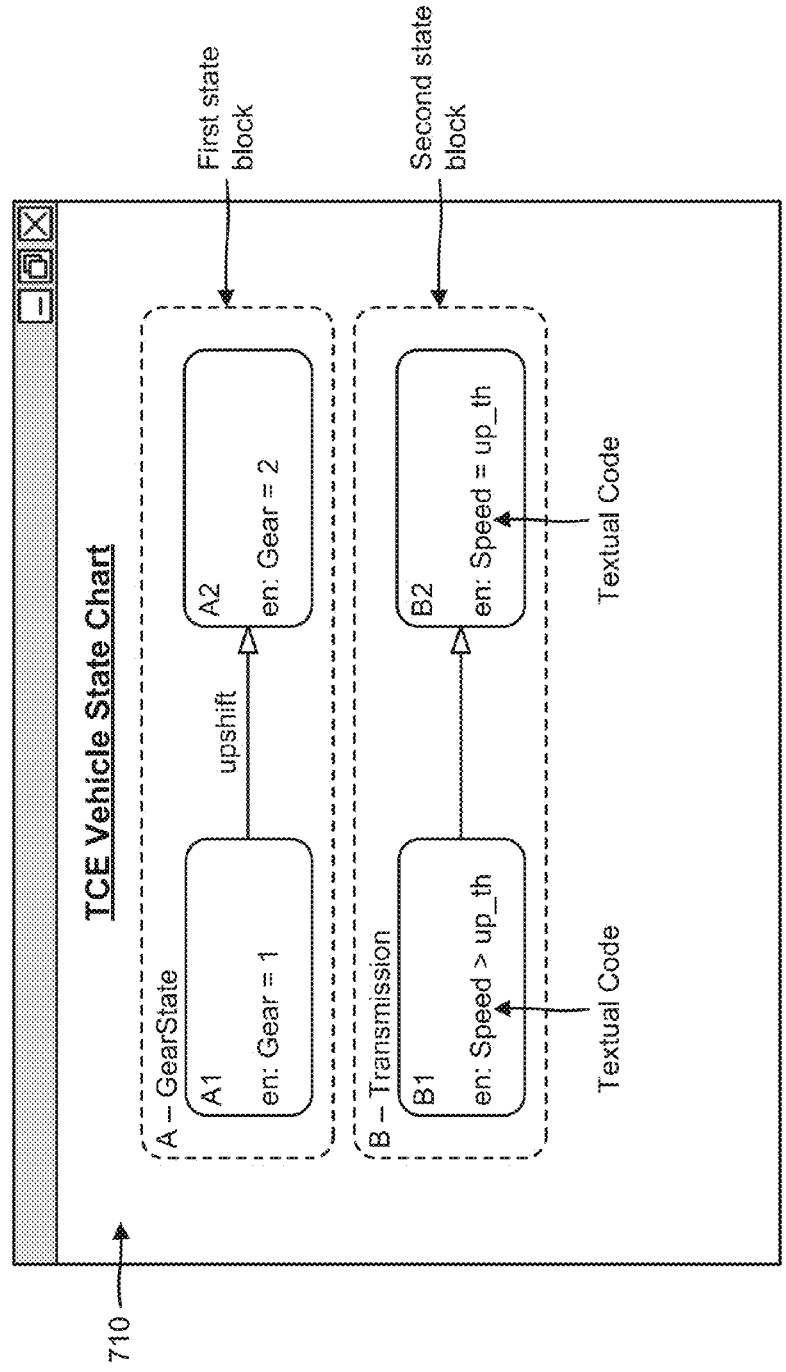
FIGS. 7A-7F are diagrams of an example relating to the example process shown in FIG. 6.

FIGS. 7A-7F are diagrams of an example 700 relating to example process 600 shown in FIG. 6. In example 700, assume that a user of client device 210 utilizes TCE 220 to create a state chart for a vehicle or to import the state chart into TCE 220. As shown in FIG. 7A, TCE 220 may cause client device 210 to display the state chart in a user interface 710 as the user creates the state chart or after the user imports the state chart.

The state chart may include a first state block (e.g., state block A) and a second state block (e.g., state block B). State block A may include a representation of a gear state associated with the vehicle. As further shown in FIG. 7A, state block A may include state block A1 and state block A2. State block A1 may include a representation of a first gear state associated with the vehicle (e.g., Gear=1), and state block A2 may include a representation of a second gear state associated with the vehicle (e.g., Gear=2). State block A1 and state block A2 may include textual code in a language that may be dynamically typed, array based, etc. (e.g., en: Gear=1 and en: Gear=2, which may indicate a vehicle gear) generated in a textual environment of the TCE and understood by textual engine 228. State block A1 may execute the textual code (e.g., en: Gear=1), and may provide results of the execution to state block A2. State block A2 may execute the textual code (e.g., en: Gear=2), based on the results received from state block A1.

State block B may include a representation of a transmission state associated with the vehicle. As further shown in FIG. 7A, state block B may include state block B1 and state block B2. State block B1 may include a representation of a first transmission speed, and state block B2 may include a representation of a second transmission speed. State block B1 and state block B2 may include textual code (e.g., en: Speed>up_th and en: Speed=up_th, which may indicate a speed associated with a vehicle upshift throttle) generated in the textual environment of the TCE and understood by textual engine 228. State block B1 may execute the textual code (e.g., en: Speed>up_th), and state block B2 may execute the textual code (e.g., en: Speed=up_th) and may output results of the execution.

Figure 7B:
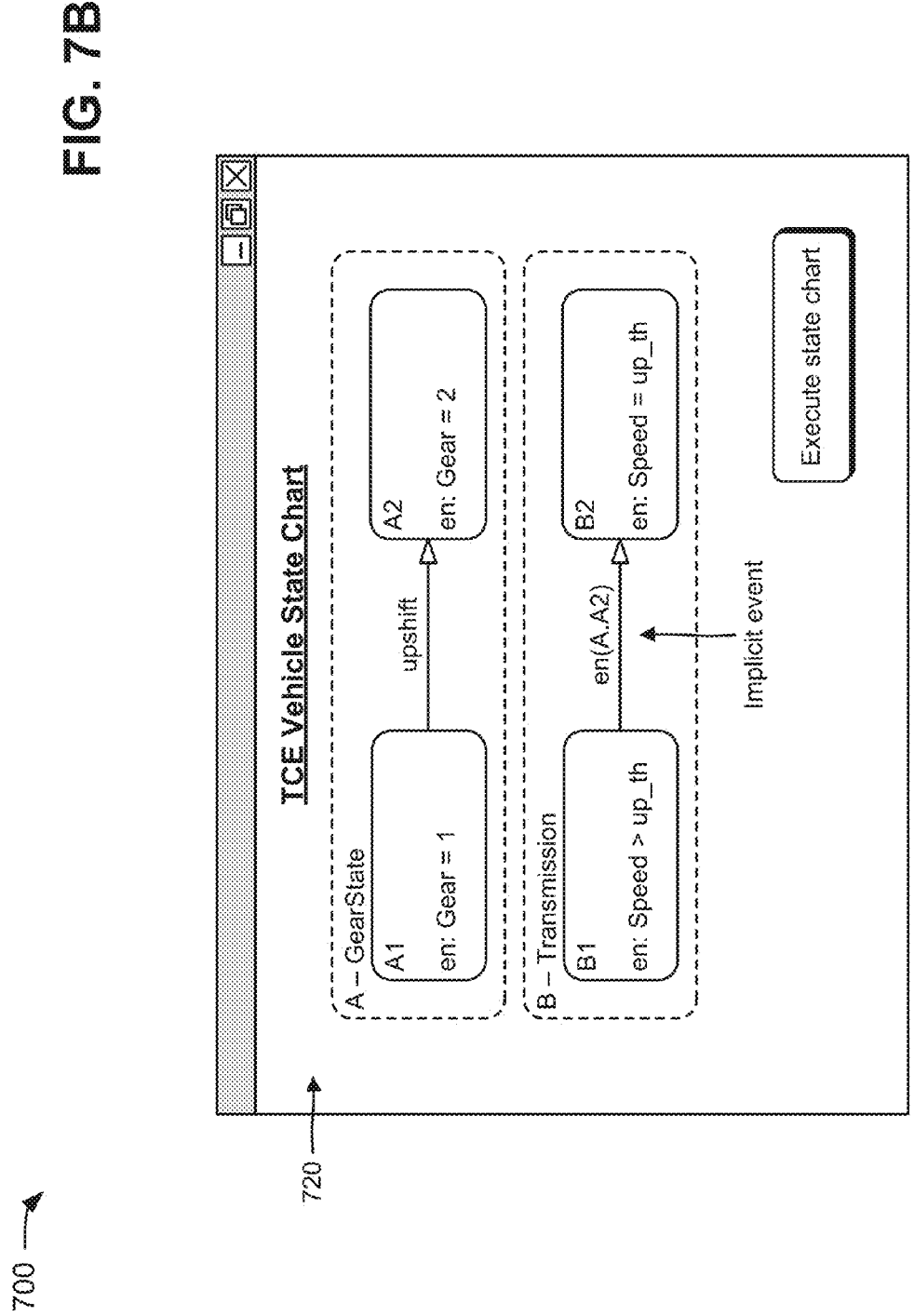
Figure 7C:
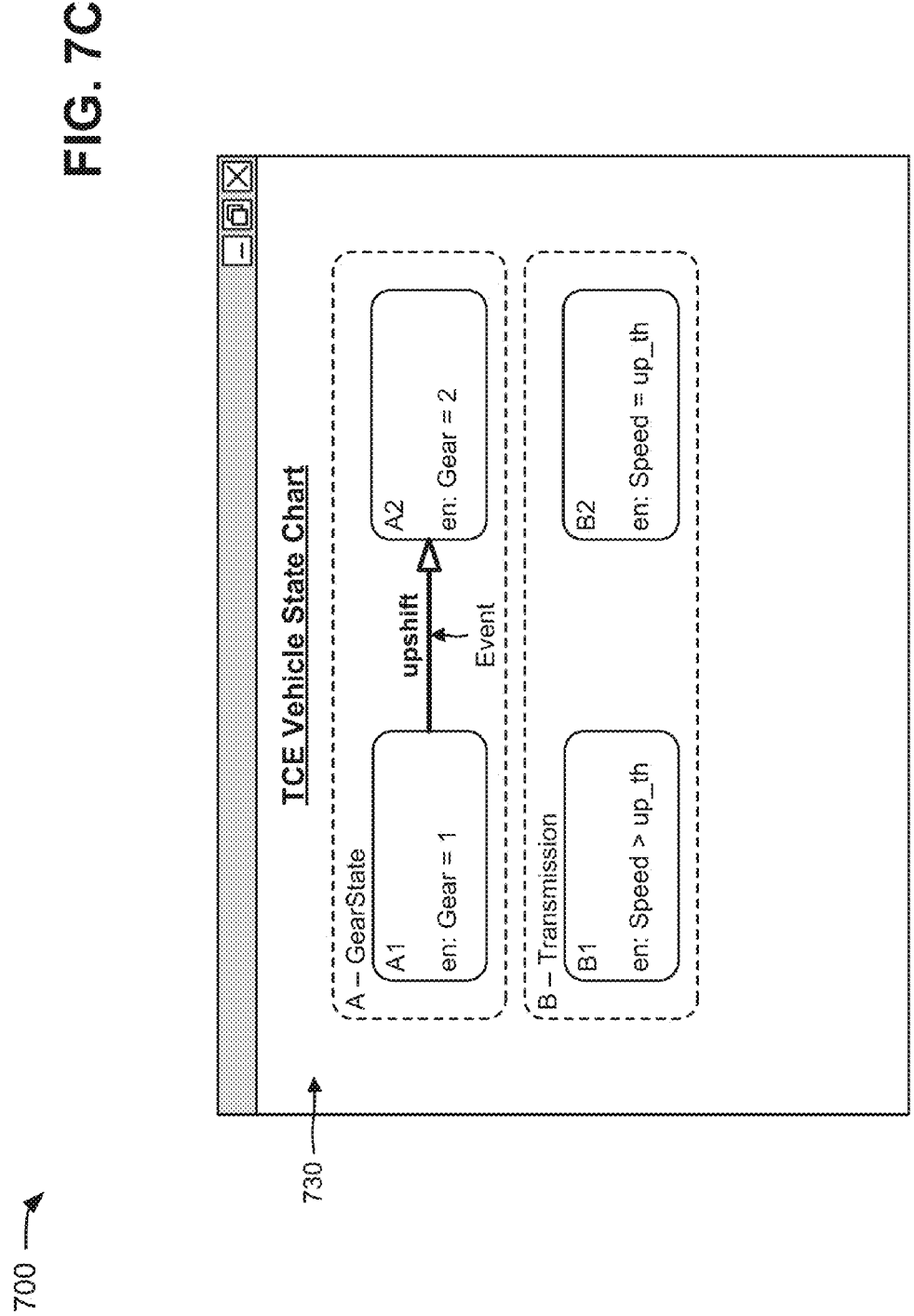
Figure 7D:
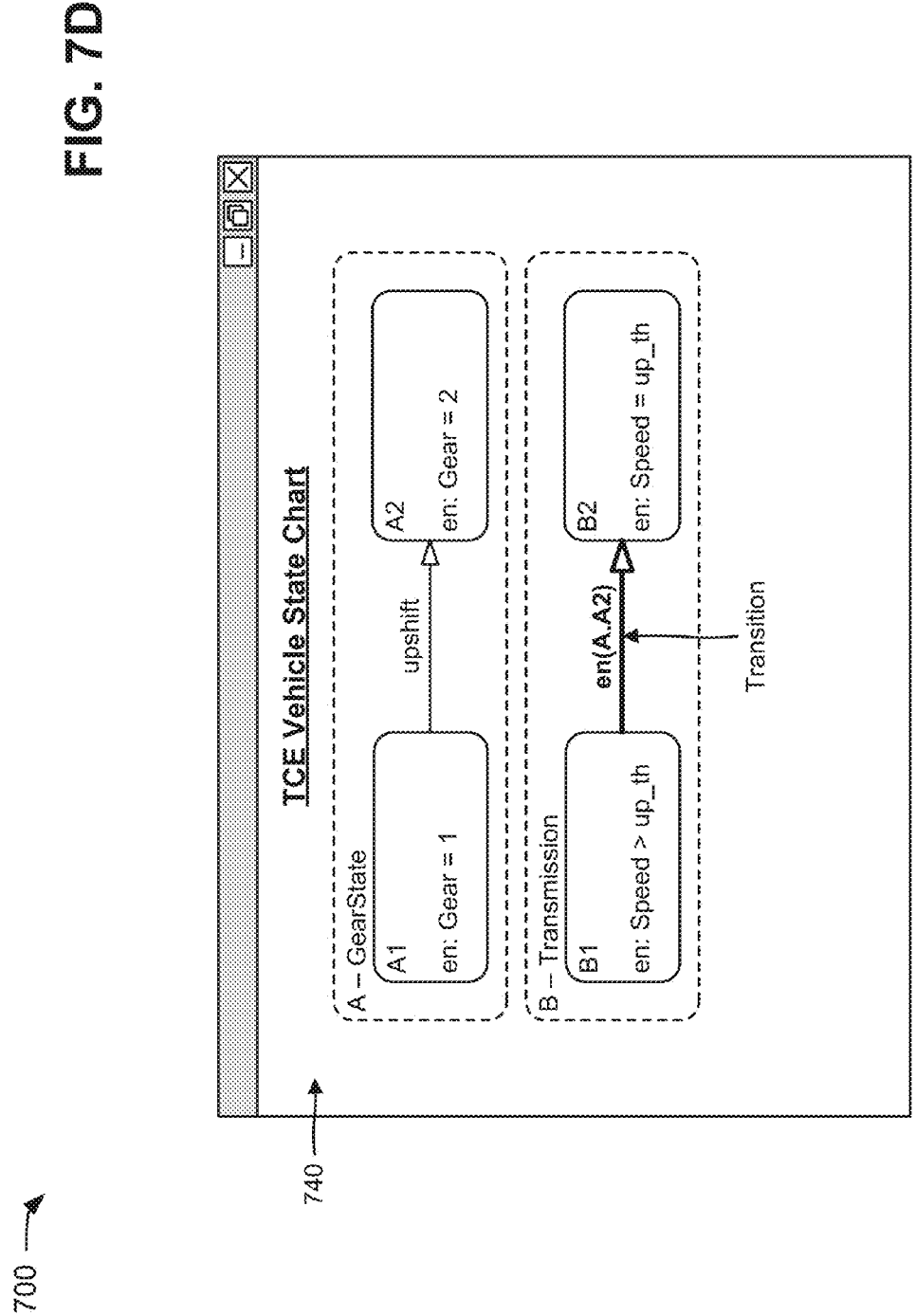
Figure 7E:
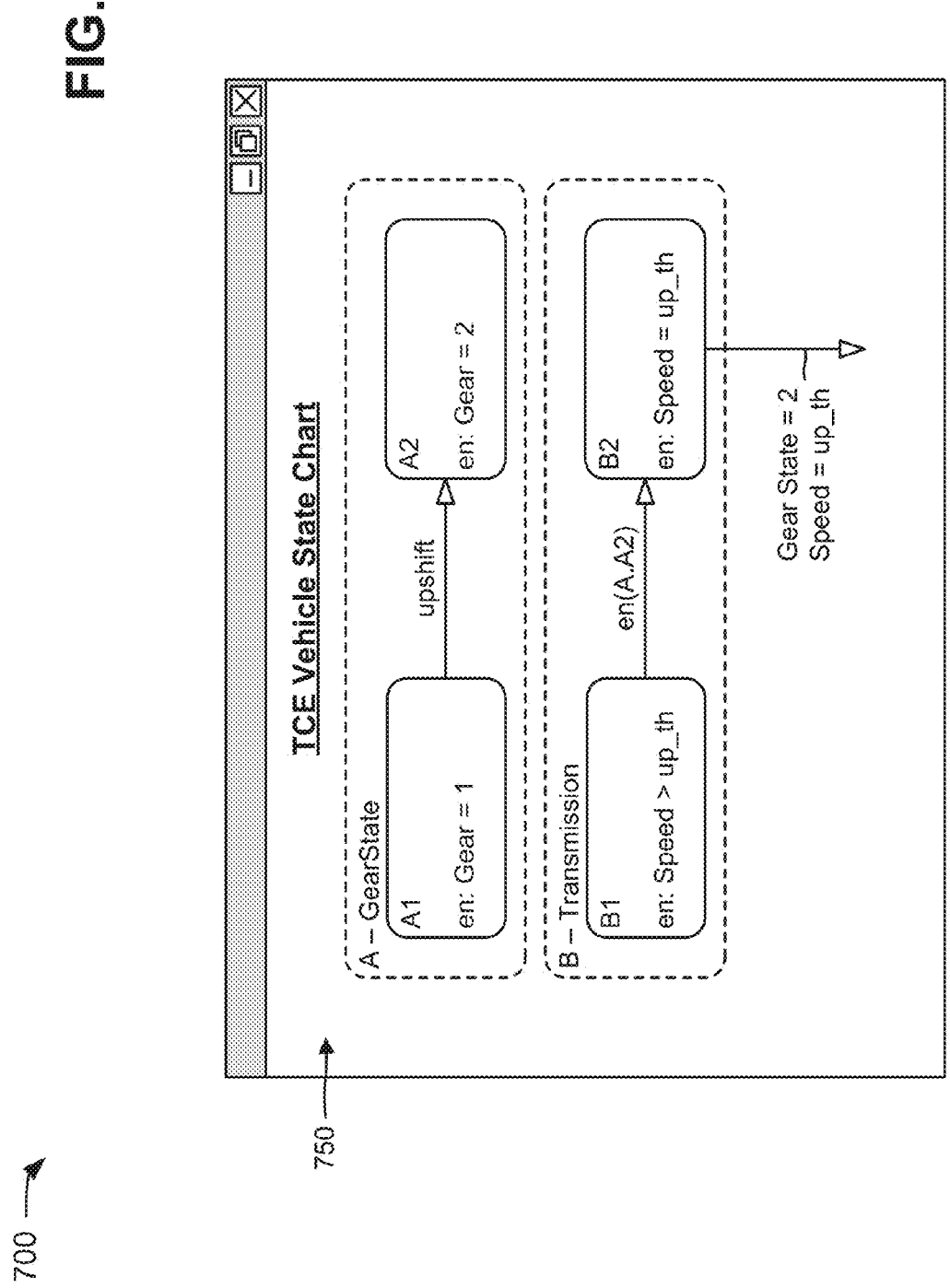

As shown in a user interface 720 of FIG. 7B, assume that the user provides an implicit event command (e.g., en(A.A2)) at a transition between state block B1 and state block B2. The implicit event command may cause state block B1 to transition to state block B2 when state block A2 is entered. After providing the implicit event command, assume that the user instructs TCE 220 to execute the state chart by entering an "execute state chart" command or by selecting an "execute state chart" button, as further shown in FIG. 7B. TCE 220 may execute the state chart based on the user's instructions, which may cause the state chart to enter state block A, execute the textual code (e.g., en: Gear=1) of state block A1 (e.g. via a default transition (not shown)), and transition from state block A1 to state block A2. As shown in a user interface 730 of FIG. 7C, the transition from state block A1 to state block A2 may simulate shifting the vehicle from first gear to second gear, and may constitute the event (e.g., entering state block A2) referenced by the implicit event command.

TCE 220 may detect that state block A2 has been entered (e.g., the event occurs), and may mark state block B as active. TCE 220 may execute the textual code (e.g., en: Speed>up_th) of state block B1, and may cause state block B1 to transition to state block B2, pursuant to the implicit event command and as shown in a user interface 740 of FIG. 7D. TCE 220 (e.g., textual engine 228) may execute the textual code (e.g., en: Speed=up_th) of state block B2, and may output results based on the execution of the textual code. As shown in a user interface 750 of FIG. 7E, the results may include Gear=2 and Speed=up_th.

In example 700, now assume that the user wishes to add, to the state chart, another state block that simulates a throttle state of the vehicle. As shown in a user interface 760 of FIG. 7F, the user may add a state block C to the state chart. State block C may include a representation of a throttle state associated with the vehicle. As further shown in FIG. 7F, state block C may include state block C1 and state block C2. State block C1 may include a representation of a first throttle position, and state block C2 may include a representation of a second throttle position. State block C1 and state block C2 may include textual code (e.g., en: Throttle<up and en: Throttle=up, which may indicate a state associated with the vehicle throttle) generated in the textual environment of the TCE and understood by textual engine 228. State block C1 may execute the textual code (e.g., en: Throttle<up), and state block C2 may execute the textual code (e.g., en: Throttle=up) and may output results of the execution.

Figure 7F:
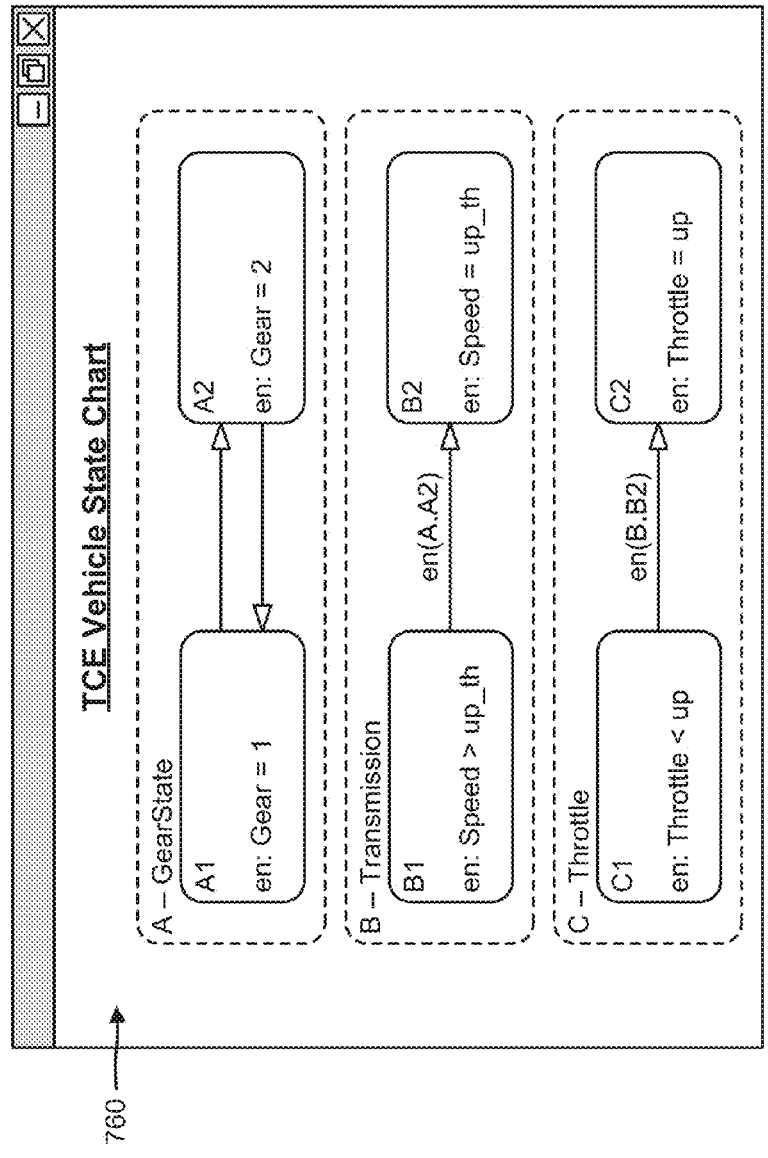

As further shown in FIG. 7F, the implicit event command may provide an intuitive mechanism for the user to scale an implicit event to other state blocks of the state chart. For example, assume that the user provides an implicit event command (e.g., en(B.B2)) at a transition between state block C1 and state block C2. The implicit event command may cause state block C1 to transition to state block C2 when state block B2 is entered.

As indicated above, FIGS. 7A-7F are provided merely as an example. Other examples are possible and may differ from what was described with regard to FIGS. 7A-7F.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

The term code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
receiving a state chart generated via a technical computing environment,
the state chart including a textual portion and a graphical portion,
the state chart including:
a first state block,
a second state block, and
an implicit event command associated with the first state block,
the graphical portion including the implicit event command,
the second state block including textual code understood by a textual engine of the technical computing environment, and
the receiving the state chart being performed by a device;
parsing the state chart into the textual portion and the graphical portion,
the parsing being performed by the device;
initiating execution of the state chart,
the initiating the execution of the state chart being performed by the device;
identifying, during the execution of the state chart, the implicit event command,
the identifying the implicit event command including:
searching the state chart for commands that include information associated with implicit event commands, and
identifying the implicit event command based on searching the state chart, and
the identifying the implicit event command being performed by the device;
transforming the implicit event command, which is not understood by a graphical engine of the technical computing environment, into a transformed implicit event command that is understood by the graphical engine,
the transforming the implicit event command into the transformed implicit event command including:
providing the implicit event command to a transformer, and
transforming, with the transformer, the implicit event command into the transformed implicit event command,
the transforming being performed by the device;
parsing, during the execution of the state chart, the transformed implicit event command to identify an event in the state chart and a command associated with the transformed implicit event command,
the transformed implicit event command referencing the event in the state chart without identifying the second state block,
the event being associated with an action associated with the first state block, and
the parsing the transformed implicit event command being performed by the device;
receiving, during the execution of the state chart, an indication of an occurrence of the action associated with the first state block,
the receiving the indication being performed by the device; and
initiating the second state block based on the indication and based on the command,
the second state block being initiated without an explicit event command being provided in the second state block, and
the initiating the second state block being performed by the device.

2. The method of claim 1, further comprising:
executing, when the second state block is initiated, the textual code with the textual engine of the technical computing environment; and
outputting or storing results of executing the textual code.

3. The method of claim 1, where the event includes one of:
entering the first state block,
executing textual code provided in the first state block, or
generating a particular output by executing the textual code provided in the first state block.

4. The method of claim 1, further comprising:
providing one or more additional state blocks in the state chart; and associating the implicit event command with the one or more additional state blocks.

5. The method of claim 4, further comprising:
initiating re-execution of the state chart;
receiving, during the re-execution of the state chart, another indication of occurrence of the action associated with the first state block; and
initiating the second state block and the one or more additional state blocks based on the other indication.

6. The method of claim 1, where initiating the second state block based on the indication is performed by the graphical engine of the technical computing environment,
the graphical engine being different than the textual engine.

7. The method of claim 1, further comprising:
monitoring the execution of the state chart; and
identifying, based on monitoring the execution of the state chart, the implicit event command and information indicating that the implicit event command is associated with the first state block.

8. A device, comprising:
one or more processors to:
receive a state chart generated via a technical computing environment,
the state chart including a textual portion and a graphical portion,
the state chart including:
a first state block,
a second state block, and
an implicit event command associated with the first state block, and
the graphical portion including the implicit event command,
the second state block including textual code understood by a textual engine of the technical computing environment;
parse the state chart into the textual portion and the graphical portion;
initiate execution of the state chart;
identify, during the execution of the state chart, the implicit event command,
the one or more processors, when identifying the implicit event command, being to:
search the state chart for commands that include information associated with implicit event commands, and
identify the implicit event command based on searching the state chart;
transform the implicit event command, which is not understood by a graphical engine of the technical computing environment, into a transformed implicit event command that is understood by the graphical engine,
the one or more processors, when transforming the implicit event command into the transformed implicit event command, being to:
provide the implicit event command to a transformer, and
transform, with the transformer, the implicit event command into the transformed implicit event command;
parse, during the execution of the state chart, the transformed implicit event command to identify an event in the state chart and a command associated with the transformed implicit event command,
the transformed implicit event command identifying the event in the state chart without identifying the second state block,
the event being associated with an action associated with the first state block, and
the transformed implicit event command including a reference to the first state block;
receive, during the execution of the state chart, an indication of an occurrence of the action associated with the first state block; and
initiate the second state block based on the indication and based on the command,
the second state block being initiated without an explicit event command being provided in the second state block.

9. The device of claim 8, where the one or more processors are further to:
execute, when the second state block is initiated, the textual code with the textual engine of the technical computing environment, and
output or store results of the execution of the textual code.

10. The device of claim 8, where the event includes one of:
entering the first state block,
executing textual code provided in the first state block, or
generating a particular output by executing the textual code provided in the first state block.

11. The device of claim 8, where the one or more processors are further to:
provide one or more additional state blocks in the state chart, and
associate the implicit event command with the one or more additional state blocks.

12. The device of claim 11, where the one or more processors are further to:
initiate re-execution of the state chart,
receive, during the re-execution of the state chart, another indication of occurrence of the action associated with the first state block, and
initiate the second state block and the one or more additional state blocks based on the other indication.

13. The device of claim 8, where the graphical engine of the technical computing environment initiates the second state block based on the indication,
the graphical engine being different than the textual engine.

14. The device of claim 8, where the one or more processors are further to:
monitor the execution of the state chart; and
identify, based on monitoring the execution of the state chart, the implicit event command and information indicating that the implicit event command is associated with the first state block.

15. A non-transitory computer-readable medium storing instructions, the instructions comprising:
one or more instructions that, when executed by one or more processors of a device, cause the one or more processors to:
receive a state chart generated via a technical computing environment,
the state chart including a textual portion and a graphical portion,
the state chart including:
a first state block,
a second state block, and
an implicit event command associated with the first state block, and the graphical portion including the implicit event command, the second state block including textual code understood by a textual engine of the technical computing environment;

parse the state chart into the textual portion and the graphical portion;

initiate execution of the state chart;

search, during the execution of the state chart, the state chart for commands that include information associated with implicit event commands;

identify, during the execution of the state chart, the implicit event command based on searching the state chart;

provide the implicit event command, which is not understood by a graphical engine of the technical computing environment, to a transformer, transform, with the transformer, the implicit event command into a transformed implicit event command that is understood by the graphical engine, parse, during the execution of the state chart, the transformed implicit event command to identify an event in the state chart and a command associated with the transformed implicit event command, the transformed implicit event command identifying the event in the state chart without identifying the second state block, the event being associated with an action associated with the first state block, and the transformed implicit event command including a reference to the first state block;

receive, during the execution of the state chart, an indication of an occurrence of the action associated with the first state block; and initiate the second state block based on the indication and based on the command, the second state block being initiated without an explicit event command being provided in the second state block.

16. The non-transitory computer-readable medium of claim 15, where the instructions further comprise:

one or more instructions that, when executed by the one or more processors, cause the one or more processors to:

execute, when the second state block is initiated, the textual code with the textual engine of the technical computing environment, and output or store results of the execution of the textual code.

17. The non-transitory computer-readable medium of claim 15, where the event includes one of:

entering the first state block, executing textual code provided in the first state block, or generating a particular output by executing the textual code provided in the first state block.

18. The non-transitory computer-readable medium of claim 15, where the instructions further comprise:

one or more instructions that, when executed by the one or more processors, cause the one or more processors to:

provide one or more additional state blocks in the state chart, and associate the implicit event command with the one more additional state blocks.

19. The non-transitory computer-readable medium of claim 18, where the instructions further comprise:

one or more instructions that, when executed by the one or more processors, cause the one or more processors to:

initiate re-execution of the state chart, receive, during the re-execution of the state chart, another indication of occurrence of the action associated with the first state block, and initiate the second state block and the one or more additional state blocks based on the other indication.

20. The non-transitory computer-readable medium of claim 15, where the graphical engine of the technical computing environment initiates the second state block based on the indication, the graphical engine being different than the textual engine.

* * * * *